(12) United States Patent
Tehranipoor et al.

(10) Patent No.: US 11,475,168 B2
(45) Date of Patent: Oct. 18, 2022

(54) CAD FRAMEWORK FOR POWER SIDE-CHANNEL VULNERABILITY ASSESSMENT

(71) Applicant: University of Florida Research Foundation, Inc., Gainesville, FL (US)

(72) Inventors: Mark M. Tehranipoor, Gainesville, FL (US); Adib Nahiyan, Gainesville, FL (US); Domenic J. Forte, Gainesville, FL (US); Jungmin Park, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 500 days.

(21) Appl. No.: 16/520,002

(22) Filed: Jul. 23, 2019

(65) Prior Publication Data

US 2021/0026994 A1 Jan. 28, 2021

(51) Int. Cl.
*G06F 21/75* (2013.01)
*G06F 30/30* (2020.01)
*G06F 30/34* (2020.01)
*G06F 119/06* (2020.01)

(52) U.S. Cl.
CPC ............ *G06F 21/755* (2017.08); *G06F 30/30* (2020.01); *G06F 2119/06* (2020.01)

(58) Field of Classification Search
CPC .... G06F 21/755; G06F 30/30; G06F 2119/06; G06F 30/343; G06F 17/50; G06F 21/55
See application file for complete search history.

(56) References Cited

U.S. PATENT DOCUMENTS

| 8,225,248 | B2 * | 7/2012 | Chen ................ G01R 31/31721 716/132 |
| 2007/0145981 | A1 * | 6/2007 | Tomita ................. G11C 29/028 324/509 |
| 2015/0074159 | A1 * | 3/2015 | Poschmann .............. G09C 1/00 708/270 |

(Continued)

OTHER PUBLICATIONS

"Side-Channel Vulnerability Variants 3a and 4"—Cybersecurity & Infrastructure Security Agency, May 22, 2018 https://www.cisa.gov/uscert/ncas/alerts/TA18-141A (Year: 2018).*

(Continued)

*Primary Examiner* — Randy A Scott
(74) *Attorney, Agent, or Firm* — Thomas | Horstemeyer, LLP

(57) ABSTRACT

Various examples are provided related to power side-channel vulnerability assessment. In one example, a method includes identifying target registers in an IC design; generating input patterns associated with a target function that can generate a power difference in the target registers when processing the target function; determining a side-channel vulnerability (SCV) metric using the power difference produced by the input patterns; and identifying a vulnerability in the IC design using the SCV metric. Identification of the vulnerability allows for modification of the IC design at an early stage, which can avoid power side-channel attacks (e.g., DPA and CPA) in the fabricated IC design. The method can be used for pre-silicon power side-channel leakage assessment of IC designs such as, e.g., cryptographic and non-cryptographic circuits.

17 Claims, 9 Drawing Sheets

(56) References Cited

U.S. PATENT DOCUMENTS

2016/0098565 A1* 4/2016 Vedula .................. G06F 21/577
726/24
2016/0140340 A1* 5/2016 Walters .................... G09C 1/00
726/22

OTHER PUBLICATIONS

"Side Channel Leakage Analysis—Detection, Exploitation, and Quantification"—Xin Ye, Worcester Polytechnic Institute, Dec. 2014 https://digital.wpi.edu/downloads/v118rd657 (Year: 2014).*

* cited by examiner

Table 1: Comparison: pre- and post-silicon PSCL evaluation.

|  | Pre-silicon | | | Post-silicon |
| --- | --- | --- | --- | --- |
|  | RTL | Gate-level | Layout |  |
| PSCL assessment time | Medium | High | Very High | Low |
| PSCL assessment accuracy | Low | Medium | High | Very High |
| Flexibility for changing design | High | Medium | Low | Not Feasible (ASIC); Difficult (FPGA) |

Algorithm 1 Target Registers Identification

1: procedure IDENTIFYING AND GROUPING TARGET REGISTERS
2:   Input: $RegList, T_{path}$
3:   Output: Group of Target Registers
4:     for all $r \in RegList$ do
5:       $T\_SD_r \leftarrow Extarct\ sequential\ depth\ from\ T_{path}$
6:       $T\_CK_r \leftarrow FanIn(r, T\_SD_r) \in Key$
7:       $T\_CPI_r \leftarrow FanIn(r, T\_SD_r) \in Plaintext$
8:       if $((length(T\_CPI_r) \geq 1)\ \&\ (length(T\_CK_r) > 1)\ \&$
9:         $(length(T\_CK_r) < K_{Th}))$ then
10:         $r \rightarrow Target\ Register$
11:         $G_r \leftarrow \{r, T\_CK_r, T\_CPI_r, T\_SD_r\}$
12:       end if
13:     end for
14:     for $<i = 1,\ i < length(G_r),\ i++>$ do
15:       for $<j = i,\ j < length(G_r),\ j++>$ do
16:         if $G_r(i) : T\_CK_r\ ==\ G_r(j) : T\_CK_r$ then
17:           $G_r(i) = \{G_r(i)||G_r(j)\}$
18:         end if
19:       end for
20:     end for
21: end procedure

FIG. 4

Algorithm 2 SPG Algorithm

1: procedure FORMAL VERIFICATION BASED PATTERN GENERATION
2:   Input: Design files, $G_r\{r, T\_CPI_r, T\_SD_r\}, hi$
3:   Output: $SCV$-guided Pattern $(PI_{hi})$
4:     #Constraints
5:     $Apply\ fixed\ input\ constraint \rightarrow K$
6:     $Apply\ fixed\ input\ constraint \rightarrow PI \notin T\_CPI_r$
7:     $Apply\ bind\ input\ constraint \rightarrow T\_CPI_r$
8:     $Apply\ Reset$
9:     $Run$
10:    $Remove\ Reset$
11:    #Assertion
12:    $psl\ A1 : assert\ never\ ((HW(r) == hi)\ \&\&\ (clk\_count == T\_SD_r))$
13:    #Testbench Generation
14:    $Prove$
15:    $Export\ testbench \rightarrow PI_{hi}$
16: end procedure

FIG. 5

Table 2: Metric notations and platforms to which they are applied

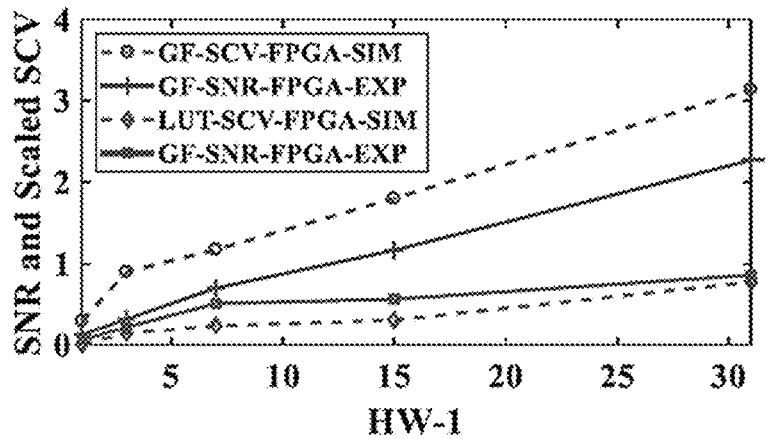
FIG. 12B
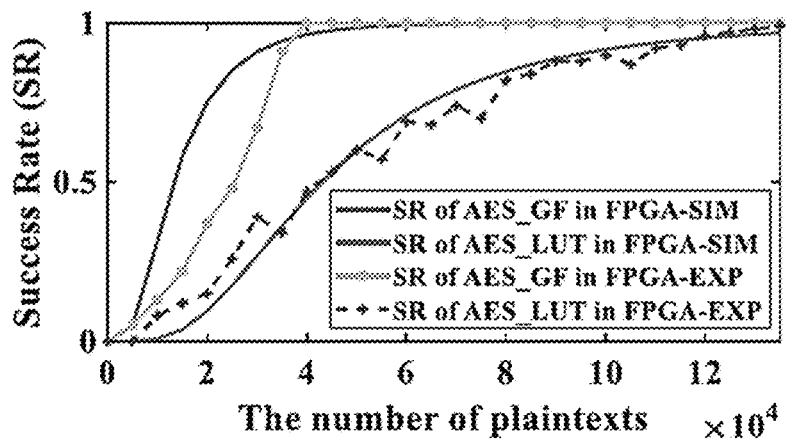
FIG. 12C
Table 3: Comparison: Area (in term of number of gates (G), LUTs (L), and registers (R)), Performance (in terms of maximum delay of the design) vs. Security (in terms of maximum SCV).
| Platform | Design | Area | Timing | SCV |
|---|---|---|---|---|
| ASIC-SIM | AES-GF | 11407 G; 796 R | 89.5 ns | $2.1 * 10^{-2}$ |
|  | AES-LUT | 2695 G; 650 R | 94.3 ns | $2.3 * 10^{-5}$ |
| FPGA-SIM | AES-GF | 3931 L; 796 R | 5.9 ns | $9.4 * 10^{-3}$ |
|  | AES-LUT | 2480 L; 650 R | 5.0 ns | $2.3 * 10^{-3}$ |
FIG. 13

CAD FRAMEWORK FOR POWER SIDE-CHANNEL VULNERABILITY ASSESSMENT

STATEMENT REGARDING FEDERALLY SPONSORED RESEARCH OR DEVELOPMENT

This invention was made with government support under contract 60NANB17D040 awarded by the National Institute of Standards and Technology. The Government has certain rights in the invention.

BACKGROUND

Cryptographic primitives have been widely employed in embedded computing systems, mobile devices and Internet of Things (loT) as well as high assurance electronic systems—military, aerospace, automotive, transportation, financial, and medical. Although the security of cryptographic algorithms have been proven to be mathematically sound, their implementations are often not. It has been demonstrated that the security of a cryptosystem can be broken by exploiting the side-channel information, e.g., power, timing and electromagnetic signals leaking from its hardware implementation. These attacks pose serious threats because they are non-invasive and are applicable to all cryptographic schemes.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 illustrates an example of an algorithm for target registers identification, in accordance with various embodiments of the present disclosure.

FIG. 5 illustrates an example of an algorithm for side-channel vulnerability (SCV), in accordance with various embodiments of the present disclosure.

FIGS. 12A-12C are plots illustrating examples of the SCV metric vs. difference in HW between ASIC-SIM and FPGA-SIM, the scaled SCV value vs. difference in HW in FPGA-SIM and signal-to-noise ratio (SNR) metric in FPGA-EXP, and success rate (SR) estimated in FPGA-SIM and SR in FPGA-EXP of AES-GF and AES-LUT implementations with respect to the number of plaintexts, respectively, in accordance with various embodiments of the present disclosure.

FIG. 13 is a table illustrating a comparison of area and performance vs. security, in accordance with various embodiments of the present disclosure.

DETAILED DESCRIPTION

Figures 1, 2:
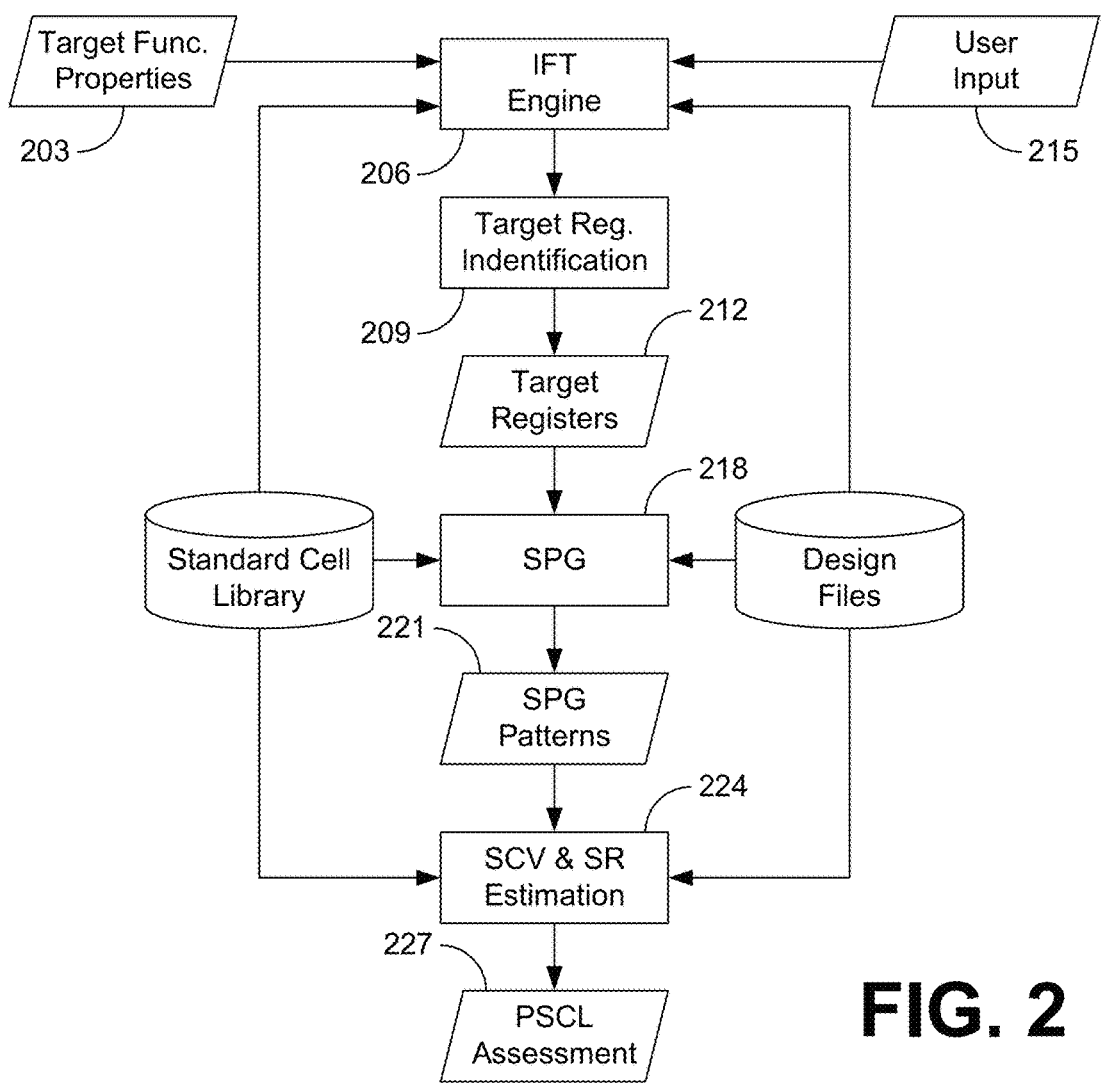
FIG. 1 is a table illustrating the comparison of pre-silicon and post-silicon power side-channel leakage (PSCL) evaluation, in accordance with various embodiments of the present disclosure.
FIG. 2 is a flowchart illustrating an example of side-channel vulnerability using information flow tracking and pattern generation (SCRIPT) framework for PSCL assessment, in accordance with various embodiments of the present disclosure.

Disclosed herein are various examples related to power side-channel vulnerability assessment. Information flow tracking and pattern generation can be used in a CAD framework. Reference will now be made in detail to the description of the embodiments as illustrated in the drawings, wherein like reference numbers indicate like parts throughout the several views.

A number of power side-channel attacks (SCAs) namely differential power analysis (DPA), correlation power analysis (CPA), mutual information attack (MIA), partitioning power analysis (PPA), etc. have been proposed and successfully demonstrated over the past two decades. The underlying principle of these attacks is to exploit the correlation between intermediate data and power consumption when attempting to extract the secret key. Different countermeasures have also been proposed to defend against SCAs, e.g., 'Masking Mechanism' which attempts to randomize the intermediate values of a cryptographic operation to decorrelate the dependencies between these values and power consumption.

Apart from power side-channel attacks and their corresponding countermeasures, another important topic in this domain is power side-channel leakage (PSCL) assessment; it is meant to evaluate the amount of information leakage from crypto hardware. Metrics for this evaluation, such as signal-to-noise ratio (SNR), t-statistic, success rate, and information theoretic metric, may be used to analyze the vulnerability of crypto hardware to power side-channel. PSCL assessment begins with a security analyst developing an attack model, followed by a verification/measurement setup. These processes involve identifying a target function, developing a power model, performing crypto operations for thousands of plaintexts and collecting their corresponding power traces on a prototype device. The analyst then evaluates how vulnerable the cryptographic implementation is to SCAs using the aforementioned metrics.

Current practices for PSCL assessment have been challenged by the following limitations:

(i) A team of security analysts with significant knowledge of side-channel attacks and countermeasures is needed in each organization. It is prohibitively expensive for a semiconductor design house to maintain a large team of security experts for every vulnerability in a system-on-chip (SoC) design. Also, the existing techniques, focused on post-silicon assessment, are dependent on the expertise of the security analyst who develops the attack model and the verification setup. Failure to develop the proper verification setup can lead to false positive and false negative results. Further, unavailability of the subject matter expert would make repeating the same experiment by others in the same organization very difficult, if not impossible.

(ii) Current evaluation techniques may need tens of thousands of test vectors to perform PSCL assessment. Therefore, these techniques have high assessment time overhead and may adversely affect time-to-market as design process continues to shorten.

(iii) These techniques are restricted to the actual fabricated hardware, i.e., silicon (microprocessor, FPGA or prototyped ASIC) and are not suitable for PSCL assessment at pre-silicon design and verification stages.

Learning from past experience in the integrated circuit design community in developing computer-aided design (CAD) tools for expediting power assessment, it is equally important to the SCA community to identify side-channel vulnerabilities as early as possible during hardware design and validation phases. Note that the terms 'hardware design' and 'design' are used interchangeably throughout this disclosure, referring to gate-level netlist of the design. Unlike software, there is little to no flexibility in changing or updating the fabricated hardware design. If a vulnerability is discovered after manufacturing while the hardware is fielded, it may cost the company millions of dollars in lost revenues, recalls, and replacement costs. As a result, addressing such vulnerabilities at the early stages of the design process has become a major interest to semiconductor and electronic design automation (EDA) industries. Identifying PSCL at early design stages would save orders of magnitude in cost, while at the same time provides utmost flexibility to address PSCL problems if they exist.

Limitations of current practices for PSCL evaluation and importance of performing this evaluation during the pre-silicon design stages, suggest to automate this process and develop CAD tools for this purpose. In this disclosure, an automated framework called SCRIPT for Side-Channel vulneRability using Information flow tracking and PaTtern generation is disclosed. SCRIPT can be easily integrated into the early design stages, here in gate-level, and validation stages of both application-specific integrated circuit (ASIC) and field programmable gate array (FPGA) design flows. SCRIPT utilizes an IFT-based side-channel vulnerability (SCV) metric for SCA vulnerability assessment. Two main engines within the SCRIPT framework include (i) information flow tracking (IFT) and (ii) SCV-guided pattern generation (SPG). The IFT identifies which particular functions are responsible for PSCL and based on this information, SPG generates just a few patterns (here, plaintext) that enable evaluation of the PSCL. Note that the terms 'patterns' and 'plaintexts' are used interchangeably throughout this disclosure.

The combination of these techniques make the SCRIPT framework efficient, accurate and generic to be applied to any hardware design that needs protection of secrets or security assets against power side-channel attacks. It can quantitatively and accurately evaluate the side-channel vulnerability of a hardware design and allows designers to compare PSCL resiliency with area, delay and power overhead for different hardware implementations of the same algorithm. Various contributions may be summarized as follows:

Different power side-channel attacks (e.g., DPA and CPA) can be analyzed to identify the underlying properties of a hardware design that an attacker exploits to perform SCAs.

Information flow tracking technique can be utilized to identify registers which exhibit the properties that cause power side-channel leakage.

An SCV metric is proposed for PSCL assessment. To evaluate SCV, formal verification techniques can be utilized to generate a few plaintexts (ideally as low as two plaintexts) that allow one to perform highly effective PSCL assessment. This approach, done for the first time, addresses the major limitation of previously proposed techniques which require thousands of plaintexts as input patterns for side-channel leakage evaluation, making SCRIPT uniquely suitable for fast pre-silicon PSCL assessment.

The relationship between the proposed SCV metric (estimated at pre-silicon) is mathematically derived with SNR metric (evaluated at post-silicon) and the scaling factor between these two metrics is empirically derived. How the SCV metric can effectively predict the success rate (SR) of power side-channel attacks given n plaintexts is shown.

Finally, case studies on Galois field (GF) and look-up table (LUT) based AES hardware implementations on Xilinx FPGAs are performed. The experimental results demonstrate that the SCRIPT can assess the PSCL vulnerability effectively at pre-silicon as validated with silicon results.

This disclosure will briefly discuss the prior work on side-channel leakage assessment and preliminaries on SCA. The SCRIPT framework is presented with results.

A technique may be shown to model the signal-to-noise ratio (SNR) with respect to DPA of a cryptographic system. This metric can be used to evaluate the effectiveness of a DPA attack where a higher SNR value indicates a more effective attack. The mutual information metric can be used for side-channel leakage evaluation. Here, a distinguisher can be built that utilizes mutual information between the observed power traces and hypothetical power leakage to rank key guesses. A general statistic model based on maximum likelihood estimation for side-channel attack analysis may be used. It can model and estimate the success rate (SR) of side-channel attacks such as DPA or CPA. However, these techniques are designed to assess side-channel leakage at the post-silicon evaluation stage and are not suitable for the pre-silicon stage as they need many plaintexts and/or measurement traces.

The use of a TVLA test to evaluate the side-channel resistance of a cryptographic module may be considered. In this technique, the collected power traces can be partitioned into two sets based on the intermediate values related to the secret information. Then, the t-statistic can be calculated to quantify the confidence level of the two sets being statistically different. A t-threshold value of 4.5 was used to test if the device leaks a side-channel information. The advantage of this technique is that the verification engineer does not need to be proficient in an evolving set of side-channel attacks. However, this technique only provides a pass/fail (not the amount of leakage) test and may unfortunately produce false positive results. Pearson's $\chi^2$-test and t-test may be used to address some limitations of TVLA. However, similar to previous approaches, these techniques are also not suitable for pre-silicon side-channel vulnerability assessment as they need many plaintexts/traces.

A comprehensive survey of simulators for side-channel analysis, e.g., PINPAS, SCARD, NCSim, OSCAR, etc. was carried out. Among these reported side-channel simulators, only two (SCARD and NCSim) work with hardware crypto modules, whereas the rest deals with software crypto algorithms implemented in microprocessors. These simulators, in general, emulate the execution of a program under analysis and use simple power estimation techniques, e.g., Hamming weight (HW) or Hamming distance (HD). In addition to not being applicable to ASICs and FPGAs, these simulators cannot produce accurate results as their power estimation model is not derived from the actual physical characteristic of the implemented design. SCARD, on the other hand, uses SPICE models with information gained from real measurements of the prototype device. This model cannot be used in pre-silicon if the prototype device is not available. NCSim utilizes a commercial Cadence power estimation tool to evaluate DPA resistance at gate-level. However, this technique also needs thousands of plaintexts, and therefore may require prohibitively large assessment time overhead.

A framework named AMASIVE for side-channel vulnerability assessment may be used to identify the hypothesis function for HW/HD model to be used for side-channel vulnerability assessment. This is limited in that it can only identify the hypothesis function and the final vulnerability assessment still needs to be carried out on a prototype device. Also, this technique needs designer involvement to identify the types of operation (e.g., permutation, substitution, etc.) each module performs. Furthermore, the hardware design itself needs to be modular because AMASIVE treats each instance as a node. As a result of these limitations, this technique may also not be suitable for pre-silicon PSCL evaluation.

To summarize, existing techniques would work reasonably well for the post-silicon evaluation stage but are not suitable for pre-silicon stages in that they utilize (and need) many plaintext/power traces for their evaluation. While applying thousands of plaintexts and collecting their power traces can be efficiently done at post-silicon, it however requires a prohibitively large assessment time overhead in the pre-silicon design stage using simulation. A fabricated device can operate in gigahertz (GHz) speed, which allows the verification engineer to collect the needed number of power traces in seconds; whereas similar simulations could take days or weeks depending on which level of abstraction being performed at, e.g., the physical layout level. For instance, simulation of a DPA attack on a small cryptographic circuit (minimum stripped version of DES) at the physical layout level took 275 hours. Thus, the assessment time and accuracy of PSCL assessment as well as the flexibility to make design changes at different pre-silicon design stages w.r.t. the post-fabricated device level illustrated in the table in FIG. 1. PSCL assessment is expected to be done efficiently and accurately in post-silicon stage. However, flexibility for making design changes is very difficult (as in FPGA) or impossible (as in ASIC). Pre-silicon design stages, e.g., RTL, gate-level and layout level are not accurate and fast, however, offer the flexibility to make design changes to address potential vulnerabilities.

Power Side-Channel Attacks

Now, a brief background on power side-channel attacks is presented with a focus on DPA and CPA, which are considered the most widely adopted power side-channel attacks. These attacks exploit the correlation between the power consumption and some intermediate data related to the key. DPA and CPA attacks rely on the following procedures.

Target Function Identification: The first part of the DPA and CPA attacks is to identify a specific operation of the encryption algorithm which is a function of the secret information (e.g., the private encryption key) and the variable that an attacker can control (e.g., plaintext) or observe (e.g., ciphertext). This operation can be defined as a target function, denoted by T=f (x, k). Here, k is the key and x is the controllable or the observable variable to the attacker, i.e., plaintext/ciphertext. An example of a target function is the AES SubBytes or SBox operation. An attacker targets a single bit of T or a subset of T for DPA/CPA attacks.

Power Trace Collection: The second step is to measure the power consumption of the cryptographic device while it encrypts or decrypts different data blocks corresponding to the target function. The power trace of data block $D_i$ can be denoted as $P_i=\{P_{i,1}, \ldots, P_{i,t^*}, \ldots, P_{i,m}\}$, where m denotes the length of the trace and $p_{i,t^*}$ is the power consumption when the target function is performed. Successful DPA and CPA needs collection of thousands of $P_i$ traces for different data blocks.

Power Model: The third step is to create a hypothetical power consumption model, typically based on Hamming-distance (HD) or Hamming-weight (HW). Here, the attacker estimates the power consumption by calculating the HD or HW from the output of the target function. The attacker also makes a key hypothesis that enumerates all possible values for the subkey k under attack. Based on the key hypothesis $k_j$, the attacker applies a plaintext or observes a ciphertext and calculates the hypothetical intermediate value $T_j=f(x_j, k_j)$. In the next step, the hypothetical intermediate values are mapped to the hypothetical power consumption values using either the HD or HW model to estimate the hypothesis power $h_j=HD(T_j)$ or $h_j=HW(T_j)$, respectively.

Key Extraction: In the fourth step, the attacker compares the hypothetical power consumption model with the measured power traces to check if the guess key hypothesis is the actual key. In a DPA attack, the attacker uses difference-of-means (DOM) $\delta$, i.e., the difference between the average power traces. $\delta$ is defined as follows:

$$\delta = E[P_{T=1}] - E[P_{T=0}], \quad (1)$$

where $E[P_{T=1}]$ represents the expected value of power traces when the specific bit T (e.g., the least significant bit (LSB)) is 1 and $E[P_{T=0}]$ represents the expected value of power traces when the specific bit T is 0. The DOM, $\delta$ for the correct key guess should be larger than those for incorrect key guesses; revealing the correct key with higher probability given more traces.

For a CPA attack, the attacker computes the Pearson correlation coefficient between the hypothesis power model and the collected power traces. The Pearson correlation coefficient is computed as follows:

$$\rho = \frac{E[H - E[H]][P - E[P]]}{\sqrt{\text{Var}[H]\text{Var}[P]}}, \quad (2)$$

where E[H−E[H]][P−E[P]] represents the covariance between the hypothesis power H and the power traces P, and the Var[H] and Var[P] represent the variance of H and P, respectively. In the CPA attack, the attacker exploits the largest ρ value to identify the correct key hypothesis.

CAD Framework: SCRIPT

The side-channel vulnerability using information flow tracking and pattern generation (SCRIPT) framework for power side-channel leakage (PSCL) assessment at a gate-level will now be described. Referring to FIG. 2, shown is a high-level overview of the SCRIPT framework for PSCL assessment, which refers to estimating a success rate (SR) at pre-silicon stage and predicting the number of plaintexts for a successful side channel attack (SCA). First, the underlying properties of the function 203 which cause side-channel leakage are extracted. Then, an information flow tracking (IFT) engine 206 can be utilized to identify registers 209 (termed as target registers 212) which exhibit these properties. The IFT engine 206 works on the gate-level netlist with some input from the user 215, e.g., the name of the key and plaintext input ports. Formal verification techniques 218 can then be employed to generate specific input patterns (plaintexts) 221 which produce a maximum power difference in the target registers. The difference in the power consumption of the target registers can be exploited by the adversary during the side-channel attack. The proposed SCV metric can then be evaluated 224 to provide a quantitative assessment 227 of how vulnerable the design is to side-channel attack. Before providing details of the SCRIPT framework, the threat model employed in this framework will first be presented.

Threat Model. Begin by assuming that the SCRIPT framework is going to be used by the semiconductor design house who develops the hardware crypto accelerator for the purpose of identifying potential side-channel leakage vulnerability. Also assume that the verification engineer using SCRIPT has access to the gate-level design of the crypto accelerator along with the standard cell libraries. The verification engineer has the white-box knowledge of the design, i.e., knows the ports corresponding to the key, plaintext and ciphertext; however, the engineer does not have the skill set for performing SCA or analyzing vulnerabilities to SCA. Therefore, the engineer can use the SCRIPT framework for performing PSCL assessment.

From a side-channel vulnerability assessment point of view, the SCRIPT framework intends to find the worst-case leakage scenario. Therefore, consider a strong attack model where it is assumed that the attacker performing the side-channel attack has in-depth knowledge of the cryptographic algorithm and has some knowledge about the implementation. For example, the attacker knows at which time instance a specific round of operation occurs. Also assume that the attacker has full control over the plaintext and can perform any number of encryption operations on the plaintext data. The attacker also has physical access to the power port which allows for observation of the power traces. Note that in this discussion, the attacker uses the plaintext input to perform SCA attack for simplicity. However, SCRIPT can also be easily extended to the case where the attacker can observe the ciphertext output to perform the SCA attack.

Properties of the Target Function. As discussed above, a function has specific properties that can be targeted during a side-channel attack. Different side-channel attacks can be analyzed and the underlying properties of a function extracted, which can be used for exploitation by side-channel attacks. These properties can be defined as follows:

P1: Function of the secret information. The target function should be a function of the secret information, e.g., encryption/decryption key or an intermediate value which is related to the key. As a simple example, the AES SBox operation is a function of the key.

P2: Function of the controllable inputs. The target function should also be a function of a variable or an input (e.g., plaintext) that an attacker can control. This property allows an attacker to control the input of the target function, to guess the hypothetical intermediate values and to create the power hypothesis model. Once again, the AES SBox operation exhibits this property as it is the function of the plaintext that an attacker can control.

P3: Function with confusion property. This property dictates that the target function possesses the confusion property, i.e., one output bit of the target function should depend on more than one key input bit. The confusion property is quantified by the confusion coefficient metric which measures the probability that given two different key guesses the respective power hypothesis model is different. This property ensures that an adversary can isolate the correct key hypothesis from the guessed key space. The AES SBox exhibits this property with high confusion coefficient metric.

P4: Function with divide-and-conquer property. The target function also is a function of a small subset of the secret information. This property allows the adversary to apply divide-and-conquer strategy to focus on one subset of the secret information at a time and extract that subset. The AES SBox operation has this property since it depends on the 8-bit subkey.

These properties can be formally defined using the following equation:

$$T=\{f(k', p')|k'\subset k\ \&\ \text{size}(k')>1\}, \quad (3)$$

where k is the key and p' is the variable that an attacker can control. k'⊂k represents the divide-and-conquer property, whereas, size(k')>1 represents the confusion property. Note that these four properties are pre-requisites for DPA and CPA attacks. Some side-channel attack, e.g., simple power analysis may not need to satisfy certain properties, e.g., property P2 (Function of the controllable inputs), and the constraints on the properties may be relaxed to evaluate such attacks as well.

Target Register. Define the registers that store the output values of the target function (i.e, T) as target registers. The switching characteristic of the target registers embeds the four properties of T that are exploited by side-channel attacks. Therefore, the switching power of these registers and their corresponding fan-in logic contribute greatly to power side-channel leakage.

As an example of the target function, the AES SBox operation has been used. However, other crypto functions (e.g., first round of AES) or non-crypto functions (e.g., logic obfuscation), having the aforementioned properties can also be used as target functions. The SCRIPT framework can autonomously identify target functions/target registers using information flow tracking which is described as follows.

Identifying Target Registers using IFT. Information flow tracking (IFT) can be utilized to identify target registers which meet the target function properties discussed above. The concept of employing fault propagation can be used to track information propagation. The IFT engine can be applied to the gate-level netlist of a design. It can utilize existing automatic test pattern generation (ATPG) tools such as Tetramax from Synopsys, Fastscan from Mentor Graphics, or Encounter Test from Cadence that are commercially available and widely used by industry. In this disclosure, Tetramax is used along with a developed Tcl script to implement the IFT engine. Below, the IFT engine will first be briefly described and then how the IFT can be utilized to satisfy function property P1 (Function of the secret information) followed by identification of target registers will be discussed.

Information Flow Tracking. The IFT engine is based on modeling secret information (e.g., the encryption key) as a stuck-at-0 and stuck-at-1 fault and leveraging the ATPG tool to detect those faults. A successful detection of faults means that the logical value of the key carrying net can be observed through the observe points, i.e., the registers. ATPG employs path sensitization algorithm which exhaustively analyzes if there exists any information flow path from a key bit to an observe point and automatically derives the input vectors which enables this information propagation.

For the IFT engine, all registers (or flip-flops) where a key bit propagates to are identified. However, traditional full-scan and full-sequential ATPG analysis cannot be used for this purpose. The full-scan ATPG can only identify the first level (sequential depth=1) registers, whereas, the full-sequential ATPG is inefficient. The full-scan ATPG only allows fault propagation to first-level registers. Fault propagation to the subsequent level of registers is blocked by the first-level scan registers. In contrast, the full-sequential ATPG search through the entire functional input space to propagate a fault to an observe point which has proven to be ineffective and extremely time-consuming, hence, typically not used in practice. This limitation can be addressed by utilizing partial scan ATPG technique. In a partial scan design, the scan chains contain some, but not all, of the sequential elements in the design. Traditionally, partial scan is used to minimize area overhead (caused by design for test (DFT) structure) while attaining targeted test coverage. However, the partial-scan approach for information flow tracking is fundamentally different from traditional partial scan. In the IFT technique, the partial-scan ATPG is used to identify the observe points through which a key bit can be observed. Note that the partial-scan ATPG will only be used for the IFT engine in the disclosed methodology. Once the verification is complete, the design can be transformed back into its original form.

Figure 3:
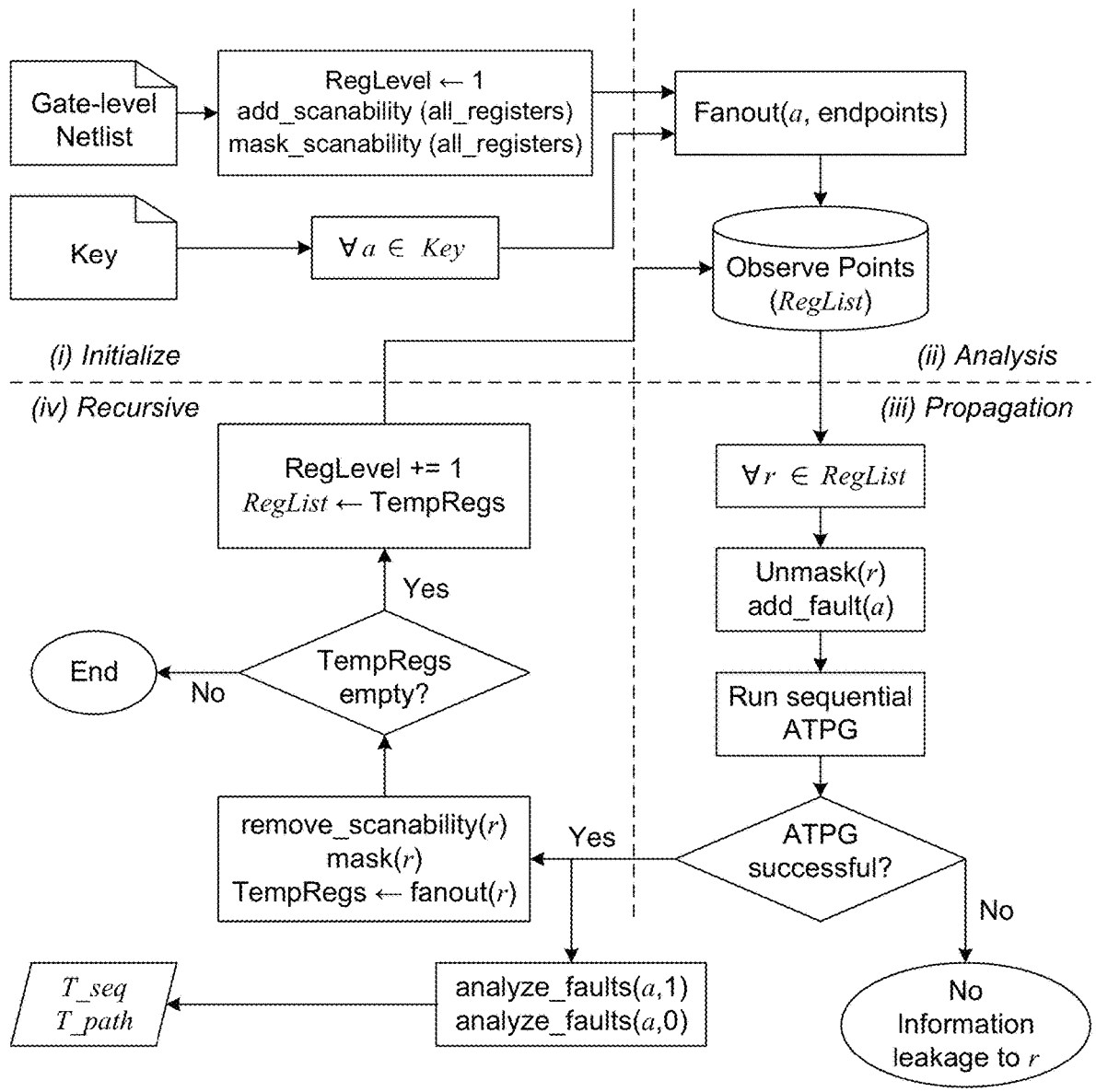
FIG. 3 is a flowchart illustrating an example of information flow tracking (IFT) utilizing partial-scan automatic test pattern generation (ATPG) to identify registers where a key bit propagates to, in accordance with various embodiments of the present disclosure.

Referring now to FIG. 3, shown is a flowchart illustrating an example of the overall flow of the IFT engine and its four main steps: (i) Initialize; (ii) Analysis; (iii) Propagation; and (iv) Recursive. The IFT engine utilizes partial scan ATPG to identify the registers where a key bit propagates to.

(i) Initialize: This first stage takes the name of the key input ports to which IFT will be applied (shown in FIG. 3 as key), the gate-level netlist of the design and the technology library (utilized for ATPG analysis) as inputs. Then, the IFT engine adds scan capability to all the registers/flip-flops (FFs) in the design to make them controllable and observable. Here, the 'What If' analysis feature can be used to virtually add and/or remove FFs from the scan chain. This feature allows the partial-scan analysis to be performed dynamically without needing to re-synthesize the netlist. Masks can also be applied to all FFs so that the key propagation to each FF can be tracked independently. Applying masks is an important step as it allows controlling fault propagation to one FF at a time.

(ii) Analysis: This stage utilizes fanout analysis to identify which FFs are located in fanout of a particular key bit. For each key bit a ∈ key (shown in FIG. 3), the asset analysis finds the FFs that are in the fanout cone of a. These FFs are potential candidates of target registers as a key bit a can potentially FIG. 3.

(iii) Propagation: This stage analyzes the propagation of each key bit a to each individual FF. To perform a comprehensive analysis of potential points of the key bit propagation, each FF must be analyzed separately. For each r ∈ RegList (shown in FIG. 3), the applied mask is removed, so the key bit propagation to r can be tracked. The next step adds the key bit a as the only stuck-at fault in the design and runs ATPG algorithm in the sequential mode to find paths to propagate a=0 and a=1 to FF r. If both, a=0 and a=1 can be detected from r, then there exists an information flow from a to r and the algorithm marks r as a potential target register. The asset propagation stage also stores the propagation path ($T_{path}$) as well as the control sequence ($T_{seq}$) needed for the key bit propagation for further analysis. Note that $T_{seq}$ contains the list of input ports and control registers which controls the information propagation from a to r.

(iv) Recursive: This stage leverages the partial-scan technique along with sequential ATPG to find propagation paths through all sequential levels until the output or the last-level FFs are reached. Here, the function remove_scanability (shown in FIG. 3) makes the ATPG tool treat r as a non-scan FF for simulation purposes without redoing DFT insertion. The FF's output ports Q and QN are used to get a new fanout emerging from r to the next level of registers. To find information flow through multiple levels of registers, the scanability of all identified registers in RegList is removed incrementally and sequential ATPG is used to create propagation paths from key bit a to subsequent-level registers. This process continues until the last level of registers.

The output of the IFT engine includes a list of registers/FFs where the key propagates to, e.g., key observe points (RegList), and the propagation path ($T_{path}$) along with the stimulus vector ($T_{seq}$) for asset propagation for each FF, r. For the IFT engine, the concept of fault propagation to track information flow has been utilized to identify target registers which are responsible for power side-channel leakage, which is not done by other IFT techniques. How the information is used to identify target registers will now be discussed.

Target Registers Identification. Once the registers RegList$_a$ where a key bit a propagates to have been identified, the stimulus vector ($T_{seq\_a}$) can be analyzed to check if the registers contain the properties of the target function. Note that all registers in RegList$_a$ satisfy the first property of P1: Function of the secret information. The reason is that the key bit a propagates to RegList$_a$. FIG. 4 shows an example of an algorithm that can be used to analyze which registers in RegList$_a$ satisfy the remaining three properties (P2, P3 and P4).

As illustrated in the example of FIG. 4, RegList and $T_{path}$ are taken as inputs (Line 2). These two lists are generated earlier by the IFT engine. Then for each r in the RegList, the sequential depth T_SD$_r$ is extracted from $T_{path}$ (Line 5). Next, successive fanin analysis is performed to find the (i) control key port names T_CK$_r$ and (ii) control plaintext port names T_CPI$_r$ (Lines 6-7). Here, FanIn(r, T_SD$_r$) refers to performing fanin analysis of r up to the sequential depth T_SD$_r$r. Then, the methodology checks for the following three properties:

Whether one or more plaintext input ports control key bit propagation to (length(T_CPI$_r$)≥1). If yes, then property P2: Function of the controllable inputs is satisfied.

Whether more than one key input port's control key bit propagation to (length(T_CK$_r$)>1). If yes, then property P3: Function with confusion property is satisfied.

Whether the number of key input ports that control key bit propagation to r is less than K$_{Th}$ (length(T_CK$_r$)<K$_{Th}$). If yes, then property P4: Function with divide-and-conquer property is satisfied. Here, the K$_{Th}$ value is set to be 32, but other lengths may be used. K$_{Th}$ determines the number of possible key guesses ($2^{K_{Th}}$) and a measure of the difficulty of the key hypothesis. A higher K$_{Th}$ can be deliberately set to take into account the worst-case PSCL. Note that K$_{Th}$=32 does not refer to the key length of an encryption algorithm but refers to the maximum limit considered for the divide-and-conquer property.

If all properties are satisfied (Line 8), r is marked as a target register (Line 10) and {r,T_CK$_r$,T_CPI$_r$, T_SD$_r$} is stored in a G$_r$ variable (Line 11). After completing the above analysis for all r ∈ RegList, the algorithm analyzes the G$_r$ variables to place all r with the same control key bits in the same group (Lines 14-18). This process classifies the target register based on the controlling key bits where all r controlled by the same T_CK$_r$ is placed in the same group. This allows for the identification of which key bits control which particular set of target registers.

Target register identification in AES will be discussed below. One could argue that the target registers in a design may be known to the verification/security engineers, and therefore, there is little need in using such identification technique. The counter-argument is that SCRIPT is a very generic CAD tool for PSCL assessment of any design including non-crypto modules for asset leakage assessment. It has been shown that non-crypto designs, e.g., obfuscated logic can also leak side-channel information. While a verification engineer may sometimes know which registers are responsible for PSCL for well-known crypto modules, the engineer may not have this knowledge for all crypto/non-crypto designs. Hence, this can be a very valuable step in SCRIPT. The following section will discuss how the identified target registers are utilized to evaluate the PSCL assessment.

SCV metric. An IFT-based side-channel vulnerability (SCV) metric is proposed for PSCL assessment at the pre-silicon design stage. The SCV can be defined as follows:

$$SCV = \frac{P_{signal}}{P_{noise}} = \frac{P_{T \cdot hi} - P_{T \cdot hj}}{P_{noise}}, \quad (4)$$

Here, the signal (P$_{signal}$) refers to the difference in power consumption during the target function operation and noise (P$_{noise}$) refers to the rest of the power consumption of the overall design. P$_T$ represents the average power consumed when performing the target function. Consider that the target function consumes P$_{T \cdot hi}$ and P$_{T \cdot hj}$ power when the Hamming weight of the output of the target function is hi=HW(T$_i$) and hj=HW(T$_j$), respectively for i-th and j-th inputs. The difference between P$_{T \cdot hi}$ and P$_{T \cdot hj}$ is exploited by an attacker during the SCA. Therefore, P$_{signal}$=P$_{T \cdot hi}$-P$_{T \cdot hj}$.

Note that the definition of the SCV metric is similar to the signal-to-noise ratio (SNR) metric which has been used to evaluate the side-channel leakage assessment at post-silicon stage. The SNR metric can employ SNR=$\epsilon^2/\sigma_N^2$, where $\epsilon$ refers to the difference of mean (DOM) value obtained during the DPA attack and $\sigma_N$ refers to the variance of power signals. The SCV metric utilizes an alternative relationship for the side-channel leakage assessment. Due to the difference in SNR (post-silicon) and SCV (pre-silicon) calculation strategies, these two values will not be numerically equal. However, experimental results have shown that the SCV metric measured during the pre-silicon design stage has a high correlation to the experimentally calculated SNR metric at post-silicon. The SCV metric only differs from the SNR metric by a scaling factor. The mathematical relationship between the estimated SCV metric and the SNR metric can be established as shown in Appendix B below and the scaling factor empirically derived.

Note that performing the DPA attack on the target prototype device which typically needs thousands of plaintexts is needed for the SNR calculation. While this approach for estimating the SNR metric may be feasible at post-silicon, it is not possible at the pre-silicon stage due to high simulation time overhead. For the SCRIPT framework, a formal verification technique can be utilized to derive specific patterns allowing the derivation of the SCV metric using only a few patterns (ideally two). A vector-less power estimation technique can also be used to derive P$_{noise}$ for the design, as will be discussed.

The SCV metric provides a side-channel vulnerability measure of a hardware design at pre-silicon stage. A larger SCV value represents more vulnerability to the SCA. However, the significance of the SCV metric may be difficult to interpret by a verification engineer. To address this issue, the success rate (SR) of power side-channel attacks (SCAs) can be derived from SCV metric. The SR value represents the number of plaintexts needed to achieve a certain percentage of correct extracted key. The SR derived from the SCV metric provides a quantitative measure of SCA vulnerability.

Derivation of SR from SCV. In this section, the general mathematical analysis for the success rate based on the maximum likelihood estimation (SR) will first be presented and then the relationship between SCV and SR will be derived. Assume that observable side-channel leakage at the post-silicon evaluation stage is defined as:

$$L = \{l_j | l_j = \epsilon h_{j|k} + N, j=1,2,\ldots,n\}, \quad (5)$$

where H$_{j|k}$=HD (f (x$_j$,k)) or HW (x$_j$, k)), and N is additive Gaussian noise with the mean $\mu_N$ and the variance $\sigma_N^2$. The probability density function of L given k is:

$$f_{L|k}(l) = \frac{1}{\sqrt{2\pi}\,\sigma_N} e^{-\frac{(l-\epsilon h-\mu_N)^2}{2\sigma_N^2}}. \quad (6)$$

The likelihood function is defined as $$\mathcal{L}(k; l) = \frac{1}{n}\sum_{i=1}^{n} \ln f_{L|k}(l_i).$$

Based on the maximum likelihood estimation, a guess key of an adversary is selected as follows:

$$\hat{k} = \underset{k \in K}{\mathrm{argmax}}\,\mathcal{L}(k; l) = \underset{k \in K}{\mathrm{argmax}}\,\frac{1}{n}\sum_{i=1}^{n} \ln f_{L|k}(l_i). \quad (7)$$

If the guess key, $k_g = \hat{k}$ is equal to the correct key $k^*$, the side-channel attack is successful. The success rate (SR) is defined as follows:

$$SR = Pr[k_g = k^*] = Pr[\mathcal{L}(k^*; l) > \mathcal{L}(\langle \overline{k^*} \rangle; l)], \quad (8)$$

where $\langle \overline{k^*} \rangle$ denotes all wrong keys, i.e., $\{k_1, k_2, \ldots, k_{n_k-1}\}$ excluding $k^*$. Let $$\Delta(k^*, k_j) = \mathcal{L}(k^*; l) - \mathcal{L}(k_j; l) = \frac{1}{n}\sum_{i=1}^{n}\left[\ln f_{L|k^*}(l_i) - \ln f_{L|k_j}(l_i)\right],$$

$$\forall k_j \in \langle \overline{k^*} \rangle.$$

Since
$\ln f_{L|k}^*(l_i) - \ln f_{L|k_j}(l_i)$ for $i = 1, 2, \ldots, n$, is independently and identically distributed, $[\Delta(k^*, k_j) - \mu_{\Delta(k^*, k_j)}]/\sigma_{66(k^*, k_j)}$ has the standard normal distribution by the central limit theorem. The probability that the likelihood function of the correct key is larger than that of a wrong key, $Pr[\Delta(k^*, k_j) > 0]$ is:

$$\Phi\left(\frac{\mu_{\Delta(k^*, k_j)}}{\sigma_{\Delta(k^*, k_j)}}\right), \text{ where } \Phi(x) = \frac{1}{\sqrt{2\pi}}\int_{-\infty}^{x} e^{-x^2/2}dx.$$

The overall success rate over all wrong keys of Eq. (8) is transformed as follows:

$$SR = Pr[\Delta(k^*, k_1) > 0, \ldots, \Delta(k^*, k_{n_k-1}) > 0] \quad (9)$$
$$= \Phi_{n_k-1}\left(\sqrt{n}\sum^{-1/2}\vec{\mu}\right)$$

where $\Phi_{n_k-1}$ is the cumulative function of the $(n_k-1)$-dimensional standard normal distribution, $\Sigma$ is the $(n_k-1) \times (n_k-1)$ covariance matrix with elements $s_{ij} = n \cdot Cov(\Delta(k^*, k_i), \Delta(k^*, k_j))$, $i, j = 1, 2, \ldots, n_k-1$, and $\vec{\mu}$ is the mean vector, $$\vec{\mu} = \left[\mu_{\Delta(k^*, k_1)}, \ldots, \mu_{\Delta(k^*, k_{n_k-1})}\right]^T.$$

Theorem 1. The element of the mean vector $\vec{\mu}$ in Eq. (9) is:

$$\mu_{\Delta k^*, k_i} = E[\Delta(k^*, k_i)] = \frac{1}{2}\frac{\epsilon^2}{\sigma_N^2}E\left[(h_{|k^*} - h_{|k_i})^2\right] \quad (10)$$

for $i = 1, \ldots, n_k - 1$.

The ij-th element of $\Sigma$ in Eq. (9) is:

$$s_{ij} = \frac{\epsilon^2}{\sigma_N^2}E\left[(h_{|k^*} - h_{|k_i})(h_{|k^*} - h_{|k_j})\right] + \quad (11)$$
$$\frac{1}{4}\left(\frac{\epsilon^2}{\sigma_N^2}\right)^2\left[E\left[(h_{|k^*} - h_{|k_i})^2(h_{|k^*} - h_{|k_j})^2\right] - E\left[(h_{|k^*} - h_{|k_i})^2\right]E\left[(h_{|k^*} - h_{|k_j})^2\right]\right].$$

The proof of theorem 1 is given in Appendix A below.

In Eqs. (10) and (11), $\epsilon^2/\sigma_N^2$ is defined as signal-to-noise ratio (SNR) of the side-channel leakage and the $E[\cdot]$ terms are referred to as algorithmic confusion coefficients defined in "A statistics-based fundamental model for side-channel attack analysis" by Y. Fei et al. (*IACR Cryptology ePrint Archive*, 2014:152, 2014), which is hereby incorporated by reference in its entirety. The confusion coefficient depends on the target function, $T = f(x, k)$ affected by an attack model, e.g. the output of the target function is 0 or 1 in DPA model.

Theorem 2. Let $L^{(1)}$ denote side-channel leakage at the pre-silicon stage as follows:

$$L^{(1)} = \{l_j^{(1)} | l_j^{(1)} = \epsilon_1 h_{j|k} + N^{(1)} \text{ for } j = 1, 2, \ldots, n\}, \quad (12)$$

where $h_{j|k} = HD(f(x, k))$ or $HW(f(x, k))$, and $N^{(1)}$ is additive Gaussian noise, denoted by $\mathcal{N}(\mu_{N^{(1)}}, \sigma_{N^{(1)}}^2)$ excluding external (or measurement) noise which are observable at the post-silicon evaluation stage, denoted by $N^{(2)} \sim \mathcal{N}(\mu_{N^{(2)}}, \sigma_{N^{(2)}}^2)$. $SCV_n$ using the n bit-width target function is related to SNR in Eqs. (10) and (11) as follows:

$$SCV_n \simeq \frac{n}{\left(1 - \frac{\sigma_{N^{(2)}}^2}{\sigma_N^2}\right)}\alpha^2 SNR, \quad (13)$$

where $\alpha^2$ is the scaling factor which is equal to $\epsilon_1/\epsilon$ and SNR is $\epsilon^2/\sigma_N^2$. The proof of theorem 2 is given in Appendix B below.

Now, $\epsilon^2/\sigma_N^2$ of Eq. (11) can be estimated from SCV and the SR value derived.

SCV-Guided Pattern Generation (SPG). SPG is a novel approach to estimate $P_{signal}$ using a formal verification technique. Here, the formal verification can be utilized to derive specific patterns (plaintext in case of crypto algorithm) and a functional simulation tool used along with a power estimation tool for estimating power corresponding to the patterns. Here, the SCV-guided patterns refer to the specific patterns which have following two properties:

The SCV-guided patterns should produce the desired HW at the target registers.

The SCV-guided patterns should only introduce switching in the logic related to the target function while muting the switching of the rest of the design.

These properties allow for the estimation of the power consumption only for producing the desired HW at the target function. In other words, SPG can be utilized to estimate the $P_{T,hi}$ and $P_{T,hj}$ values. The SPG technique generates the constraints along with necessary assertions and utilizes formal the verification technique to derive the SCV-guided patterns. FIG. 5 shows an example of an SPG algorithm that can be used for estimation.

As illustrated in the example of FIG. 5, the list of target registers (r), control plaintext input ports (T_CPI$_r$), and sequential depth (T_SD$_r$) which are generated by the IFT engine (as discussed with respect to FIG. 4) are taken as inputs. The desired Hamming weight hi=HW(r) and the design files from the user are also taken as inputs. Then, some constraints are created for the formal verification tool. It first applies a fixed input constraint for all key bits and plaintext bits which are not T_CPI (Lines 6-7). In the experiments, logic 0 was applied for all fixed input constraints. Then, the algorithm applies bind constraint to T_CPI (Line 8) which tells the tool to use the same input plaintext bits in T_CPI for all clock cycles. These constraints ensure that switching only occurs in the logic of the target function while muting the switching of the rest of the design. 'Reset' constraints are also applied to ensure that every pattern generation process starts from the same initial condition (Lines 8-10).

Next, the assertions which express the desired behavior of a design under test are developed as illustrated in FIG. 5. In this case, the assertion represents the property when the Hamming weight of r is hi and when the clock count is equal to the sequential depth (T_SD$_r$) (Line 12). The latter part is important because it tells the formal tool to prove the assertion for the clock cycle when the key propagates to the 'target register'. The formal verification tool is then run to generate counter examples for the given assertion and generate a set of input patterns which causes the assertion to fail. In other words, the formal verification tool generates patterns which satisfy this condition: (HW(r)==hi) && (clk_count==T_SD$_r$). Last, the patterns are exported in, e.g., the Verilog testbench format which contains the SCV-guided patterns (PI$_{hi}$). In this disclosure, an Incisive Formal Verifier tool from Cadence has been used for performing the formal verification.

Figures 6, 7:
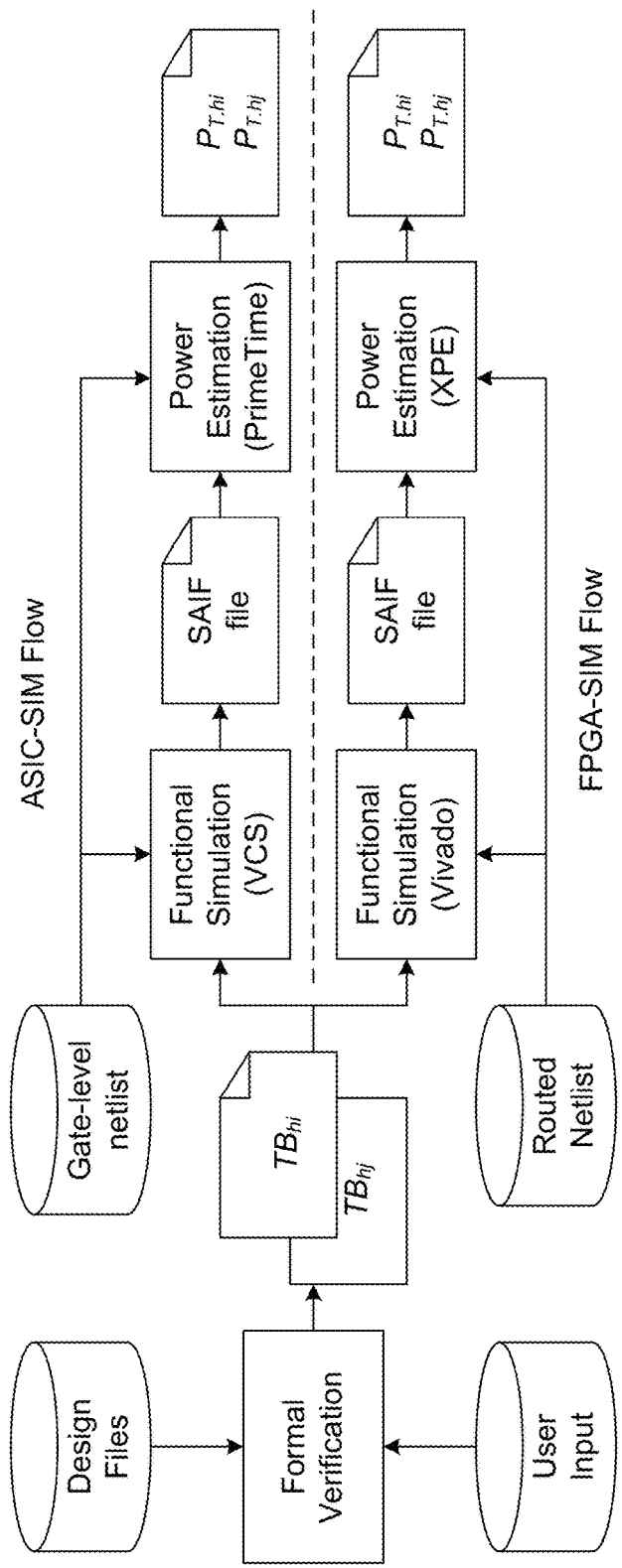
FIG. 6 is a flowchart illustrating an example of estimating power using SCV-guided pattern generation (SPG), in accordance with various embodiments of the present disclosure.
FIG. 7 is a table illustrating metric notations and platforms to which they are applied, in accordance with various embodiments of the present disclosure.

Once the patterns and testbenches TB$_{hi}$ and TB$_{hj}$ have been derived for hi and hj, respectively, the power difference corresponding to these testbenches can be estimated. FIG. 6 shows an example of the overall flow for estimating power for the SCV-guided patterns. It can be categorized into ASIC flow and FPGA flows. Here, "-SIM" in FIG. 6 refers to the power estimation for ASIC and FPGA flow in the pre-silicon level via simulation. Note that the two flows are identical except for the simulation tools used. For both ASIC and FPGA, a functional simulation tool is first used to simulate TB$_{hi}$ and TB$_{hj}$. In this example, a specific command ($set_toggle_region) is used to generate the switching activity interchange format file (.SAIF file) for each testbench. Note that the toggle region is set only for the clock cycle when the target function is running. This information can be extracted from T _SD$_r$. For an ASIC design flow, the VCS tool from Synopsys can be used, and for a FPGA, Vivado from Xilinx can be used. For the experiments, the gate-level design for an ASIC design flow was used and the place and route design for a FPGA flow was used. Note that the ASIC is also compatible with routed designs. Once the .SAIF file has been generated, this file is feed to a power estimation tool to get the power P$_{T.hi}$ and P$_{T.hi}$ corresponding to hi and hj, respectively. The PrimeTime tool from Synopsys and XPE tool from Xilinx can be used for power estimation. Lastly, P$_{signal}$=P$_{T.hi}$−P$_{T.hj}$ is derived for calculating the SCV metric.

Note that the SPG helps to isolate the difference in power consumption during the target function (P$_{signal}$) execution and estimate P$_{signal}$ using just two patterns/plaintexts. SCV-guided patterns can also be generated which produce greater P$_{signal}$ by choosing a greater difference between the Hamming weights hi and hj. This enables estimation of the SCV metric for a worst-case scenario from the PSCL perspective. In the experimental results section, it will be shown that SPG can create a greater P$_{signal}$ as compared to random patterns/plaintext.

Noise Power Estimation. For evaluating the SCV metric, the average noise power (P$_{noise}$) is estimated. One possible approach is to simulate the crypto module for multiple plaintexts and calculate the average total power. Then P$_{signal}$ can be deducted to retrieve P$_{noise}$. However, this approach simulates the crypto module for many plaintexts which is not feasible from an assessment time perspective in the pre-silicon stage as previously discussed.

To overcome this problem, a vector-less power estimation technique can be utilized. The vector-less power analysis propagates the signal probability and toggle rates from primary inputs to the outputs of internal nodes and repeats the operation until the primary outputs are reached and all nodes are assigned an activity rate. The derived activity rates can then be used to compute power consumption numbers. To run the vector-less power estimation technique, the verification engineer defines the signal probability and toggle rates of primary input ports. Here, the static signal probability is defined as the percentage of the analysis duration during which the input is driven at a high logic level and the toggle rate is defined as the rate at which a net or logic element switches compared to its input(s). The vector-less power analysis is very fast and efficient; however, it has lower accuracy as compared to pattern-based power estimation technique.

The vector-less power analysis can be utilized to estimate P$_{noise}$. To achieve good accuracy, the signal rate, static signal probability and toggle rates can be set to best resemble the practical conditions. During an actual SCA, the key will remain static. Therefore, the toggle rate can be set as zero for all key input pins to mimic this condition. For the plaintext input ports, consider that each port has equal probability of receiving 0 and 1. This is a valid assumption if a large number of random plaintexts are considered, which is common for side-channel leakage assessment. Therefore, the input signal probability can be set to be 0.5. The toggle rate of 100% can be used because in an encryption module the inputs of the synchronous elements are expected to switch on every clock edge due to the confusion and diffusion effects.

The vector-less power analysis returns the total estimated power P$_{total}$ of the design. To get the P$_{noise}$, P$_{signal}$ (defined in Eq. (4) and derived using SPG technique) can be deducted from P$_{total}$. That is, P$_{noise}$ is given by the following equation:

$$P_{noise}=P_{total}-P_{signal}. \quad (14)$$

In this work, the PrimeTime tool from Synopsys and XPE tool from Xilinx are used for the vector-less power analysis for ASIC and FPGA design flow, respectively.

Experimental Results

In this section, PSCL assessment of two different implementations of AES algorithm using SCRIPT framework is performed. First, a brief description of the two AES designs: AES Galois Field (GF) and AES lookup table (LUT), is provided. Then, the results generated by each module in the SCRIPT framework are presented and the collected results validated. It is verified that the target registers identified by the IFT engine in SCRIPT are in fact the registers responsible for side-channel leakage. Then the effectiveness of SPG engine is validated using experimental results obtained from FPGAs. Finally, the SCV metric from gate-level is compared with the experimentally calculated SNR metric in terms of correlation. It is also validated that the SCRIPT framework can effectively estimate SCA success rate (SR) and the number of plaintexts needed for the corresponding SR using FPGA results.

The table of FIG. 7 presents the notations of the metrics used in the following analyses as well as the platforms to which these metrics are applied. Here, ASIC-SIM and FPGA-SIM refer to SCRIPT simulation results using ASIC and FPGA flows in FIG. 6, while FPGA-EXP refers to the actual silicon results from experimental analysis on Xilinx FPGAs. PD, KL, SCV, SNR, and SR refers to power difference, KL-divergence, the proposed side-channel vulnerability, signal-to-noise ratio, and success rate metrics, respectively. The tick marks represent the platforms, i.e., ASIC-SIM, FPGA-SIM, and FPGA-EXP to which these metrics are applied.

Figure 8:
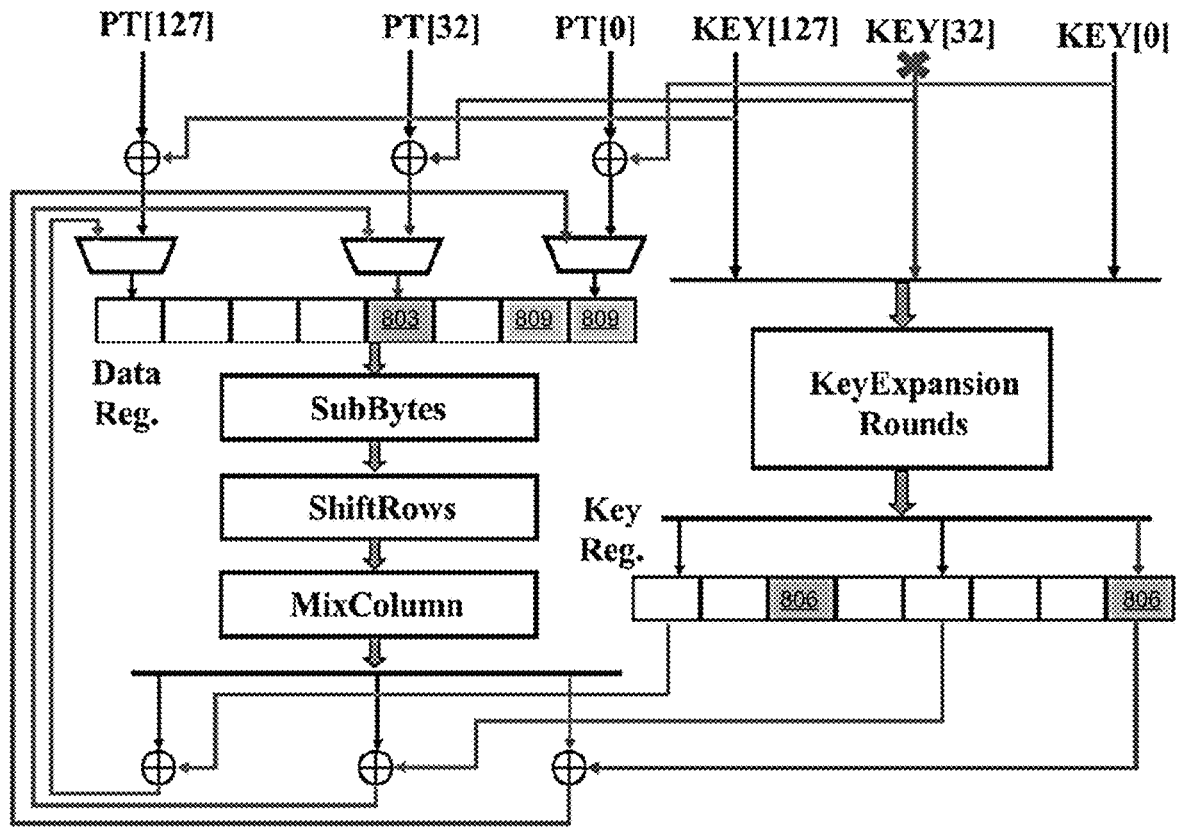
FIG. 8 is a schematic diagram illustrating an example of a hardware architecture of an AES-GF (Galois field) module, in accordance with various embodiments of the present disclosure.

AES Benchmarks. The SCRIPT framework for PSCL assessment was applied to AES-GF and AESLUT implementations. Both are open-source designs. FIG. 8 shows an example of the hardware architecture of the AES-GF encryption module. The information flow tracking process from the key bit 32 (KEY [32]) to the target data registers (on the right) is illustrated. In this architecture, the AES round operations and the AES key expansion operation occurs in parallel. The AES-GF architecture takes 10 clock cycles to encrypt each data block. The main characteristic of this design is that it implements the AES 'SubByte' operation using Galois field arithmetic.

The AES-LUT design on the other hand first performs the key expansion and stores the expanded keys in the key registers. After the key expansion, the round operation starts and takes 10 cycles to perform each encryption. The AES-LUT design implements AES 'SubByte' operation using a look-up table.

Results: Target Registers Identification. The IFT engine in SCRIPT works at the gate-level netlist. Both AES-GF and AES-LUT designs are provided in Verilog RTL format. First the RTL designs were synthesized into gate-level netlist using Synopsys Design Compiler with Synopsys standard cell library. In the experiments, the key bit 32 (KEY [32]) was selected for analysis. Note that any key bit can be analyzed and IFT engine will find the corresponding target registers, if they exist.

FIG. 8 illustrates the IFT for the AES-GF implementation. IFT first searches for the registers where the KEY [32] bit propagates to. It finds the data register 803, Data_Reg[32] (which stores the intermediate round results) along with some key registers 806 (which stores the intermediate key expansion results). Then, the SCRIPT framework checks whether these registers satisfy the properties of the target function using the target register identification algorithm (discussed with respect to FIG. 5). SCRIPT finds that the key registers 806 are not controlled by plaintext inputs and therefore, property P2: Function of the controllable inputs is not satisfied. For Data_Reg [32], SCRIPT finds one bit key input controls this register 803 and therefore, P3: Function with confusion property is not satisfied. Therefore, the register is not a target register. Then, the SCRIPT framework searches for the second level registers. Now, it finds Data_Reg[0 to 31] along with some key registers. SCRIPT finds again that key registers do not possess the P2 property and therefore, are not target registers. The Data_Reg[0 to 31], on the other hand, controlled by 32 key inputs and 32 plaintext inputs and therefore, Data_Reg[0 to 31] possess all the properties of the algorithm of FIG. 4 and are the target registers 809. SCRIPT continues to search for subsequent level registers. However, all the Data_Reg after the second level violate property P4: Function with divide-and-conquer property and therefore, are not target registers. At the end, SCRIPT returns the Data_Reg[0 to 31] along with the 32 controlling key and plaintext input port names and the sequential depth 2.

Next, it is analyzed if in fact the Data_Reg[0 to 31] registers are the actual target registers. The analysis showed that at clock cycle 2 (derived from IFT reported sequential depth 2), these registers store the first round intermediate values which are actually the target for SCAs. Note that Data_Reg[0 to 31] registers store the first round intermediate values, i.e., the outputs of the 'SBox', 'ShiftRow' and 'MixColumn' operation. Since there are no registers after the SBox blocks, the IFT engine identifies the registers storing the first round results. This is the reason why the algorithm identifies 32 bit target registers. From an attack perspective, targeting the 'MixColumn' output is more difficult since the key hypothesis for this case is 32 bits. However, from a PSCL assessment point of view, the interest is in finding the target functions which are responsible for side-channel leakage. The analysis shows that Data_Reg[0 to 31] storing the first round results follows all the necessary properties of target registers. Moreover, due to its larger bit-width, these registers leak more information compared to 'SBox' wires.

The same IFT analysis can be performed for AES-LUT operation and the target registers identified. For the AES-LUT implementation, Data_Reg[0 to 31] was also found as target registers. The reason is that both designs have similar architecture for round operations.

Results: SCV-Guided Pattern Generation and Power Estimation. SCRIPT utilizes the SPG engine to produce patterns/plaintexts with the desired Hamming weight (HW) of the target registers and calculate the SCV metric. The power difference (PD) generated by different HWs of the target registers are exploited for the DPA and CPA attacks. In this section, the SCRIPT framework is utilized to generate patterns for six different HWs and the power difference presented for the corresponding HWs for both ASIC-SIM and FPGA-SIM flow (as shown in FIG. 6). It is validated that the 'simulated' power difference derived by SCV-guided patterns at gate-level has a high correlation to the power difference 'experimentally' measured on FPGAs. Silicon results will also be presented demonstrating that the SPG pattern can generate much greater power difference than those generated by random patterns/plaintexts.

Figure 9A:
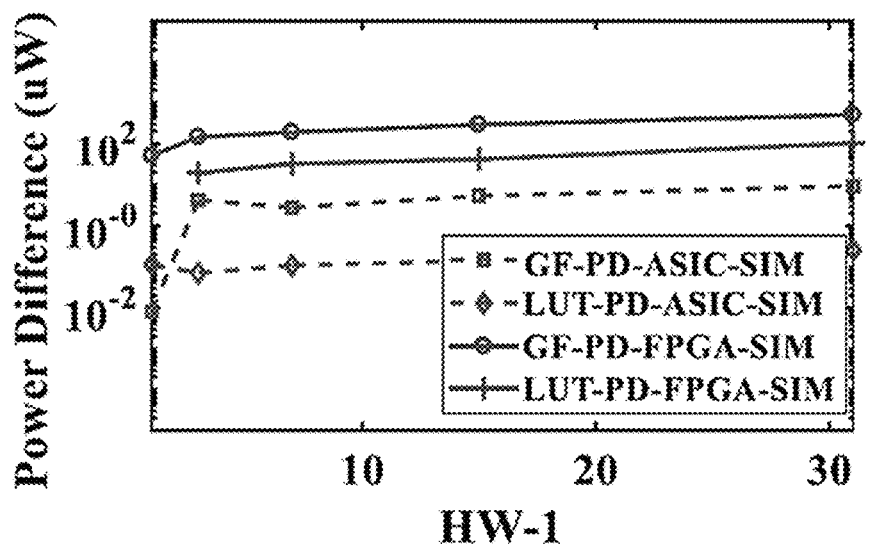
FIGS. 9A and 9B are plots illustrating examples of power difference vs. Hamming weight (HW) between application specific integrated circuit (ASIC) and field programmable gate array (FPGA) simulations (ASIC-SIM and FPGA-SIM), in accordance with various embodiments of the present disclosure.

First the SCRIPT framework is utilized to generate patterns for six different HW=1, 2, 4, 8,16, 32. FIG. 9A plots HW−1 vs. power difference using a base 10 logarithmic scale for the y-axis and a linear scale for the x-axis. For both AES-GF and AES-LUT implementations in both ASIC-SIM and FPGA-SIM, power difference increases almost linearly. This observation conforms with the power hypothesis model which states that power consumption is proportional to HW. FIG. 9A also illustrates that the power difference in AES-GF is much higher when compared to AES-LUT, which means that AES-GF leaks more side-channel information than AES-LUT. This observation is consistent in both ASIC-SIM and FPGA-SIM flows. Also, the power consumption of ASIC-SIM is much lower as compared to FPGA-SIM which is expected since FPGAs in general have larger power requirements.

One logical question that may arise is why evaluate up to 32-bit HW when an attacker in general attacks at most 8-bit of the target function. While this is true from an attack perspective, from PSCL point of view it is desirable to measure the worst-case leakage of the design. Therefore, up to 32-bit HW is measured which represents the worst-case leakage.

Figure 10:
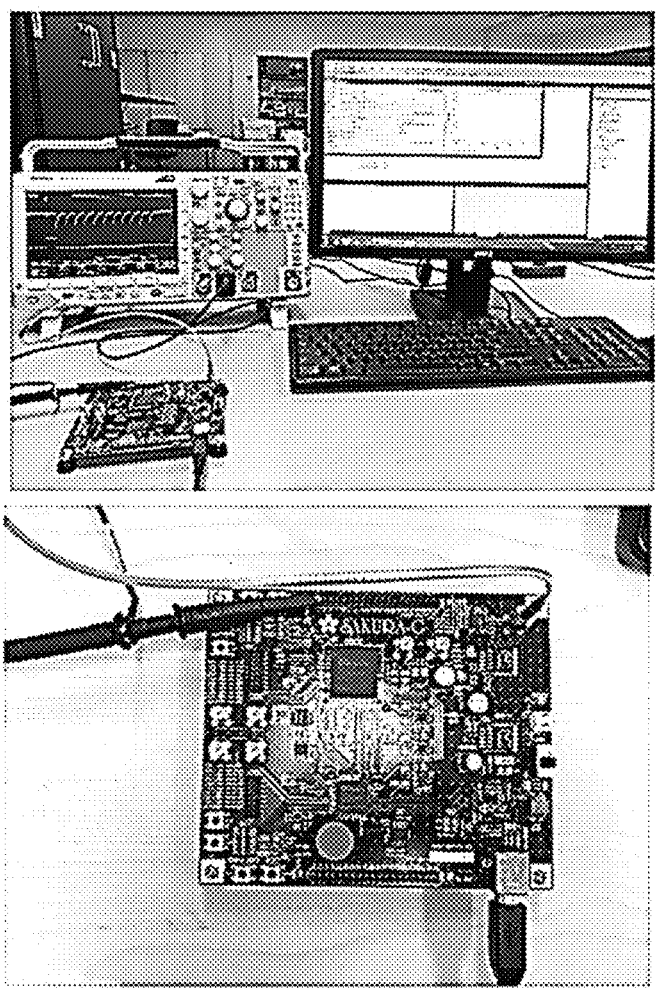
FIG. 10 includes images illustrating an experimental setup for FPGA experiment (FPGA-EXP) validation, in accordance with various embodiments of the present disclosure.

FPGA Validation: SCV-Guided Pattern Generation. For FPGA validation (expressed as FPGA-EXP), the SAKURA-G board which contains two Xilinx SPARTAN-6 FPGAs was used to implement the hardware designs. A Tektronix MDO3102 oscilloscope was used to measure the voltage drop between a shunt resistor connected to the Vdd pin. The clock frequency of the AES implementation was 24 MHz and the sampling rate and bandwidth of the oscilloscope were 500 MS/s and 250 MHz, respectively. FIG. 10 shows images of the experimental setup for FPGA validation. The same setup was used for all FPGA results presented in this disclosure.

Figure 11A:
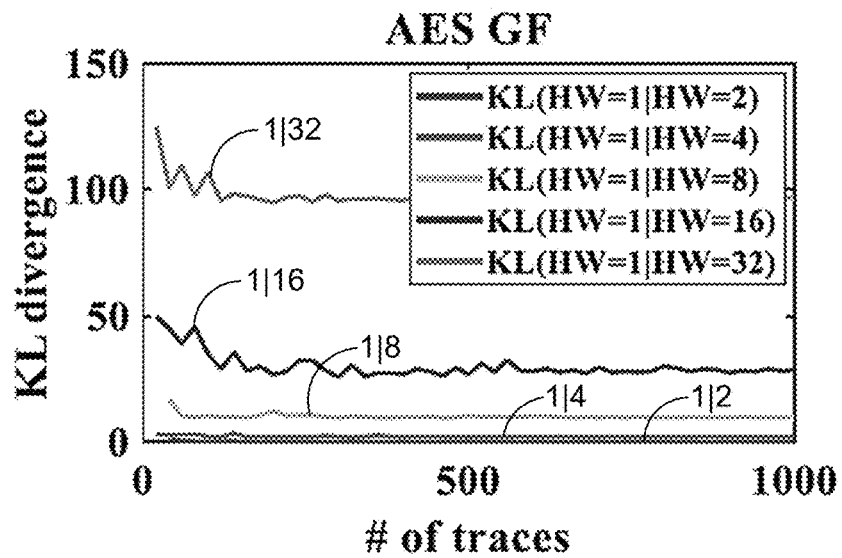
FIGS. 11A and 11B are plots illustrating examples of the (Kullback Leibler) KL-divergence of HW=1 and HW=i for AES-GF and AES-LUT (look-up table) implementations in the FPGA-EXP, in accordance with various embodiments of the present disclosure.
Figure 11B:
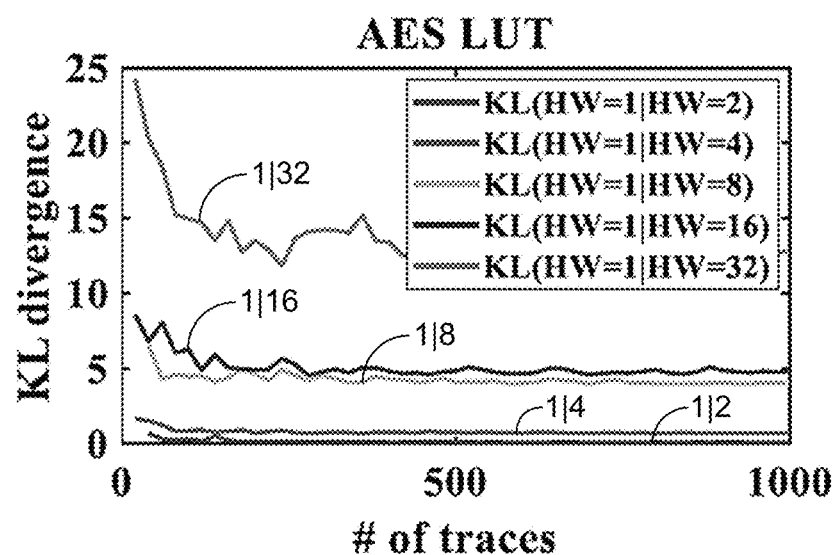

In addition, the SCV-guided patterns/plaintexts were applied and their power signals corresponding to the HWs collected, and then the KL-divergence between the resulting power signal distributions calculated. FIGS. 11A and 11B show the KL-divergence between HW=1 and HW=i (denoted by KL(HW=1|HW=i) where i=2, 4, 8,16, 32 for AES-GF and AES-LUT implementations in FPGA-EXP. It shows that the KL-divergence increases linearly with i.

Figure 9B:
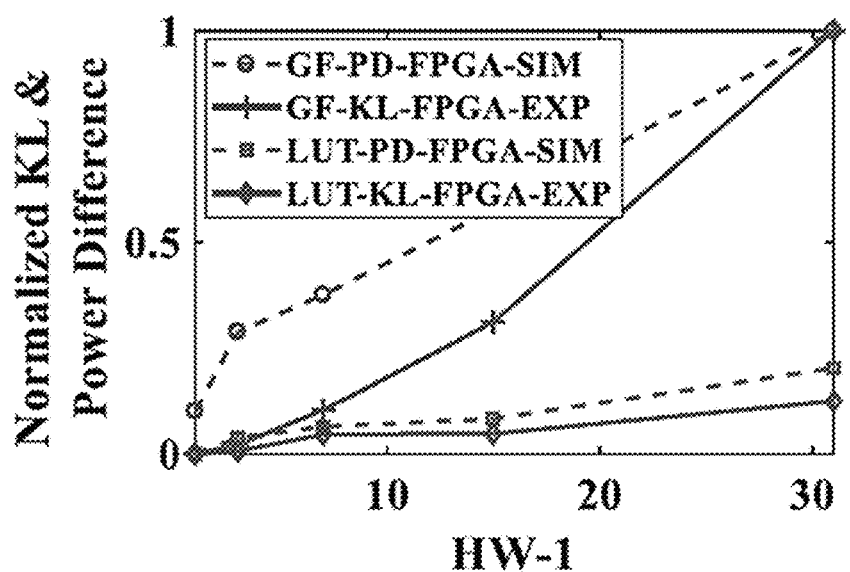

Referring back to FIG. 9B, shown is the normalized value of FPGA power differences and the normalized value of KL(HW=1|HW=i). The figure shows a good correlation between the simulated (SIM) power difference and experimentally measured (EXP) KL-divergence. The Pearson correlation coefficient for AES-GF is 0.96, whereas for AES-LUT it is 0.98. This result validates that the power difference in FPGA-SIM evaluated by the SPG engine at gate-level is highly correlated with the KL divergence in FPGA-EXP.

Random patterns were also used to estimate the KL-divergence using the procedure described in "Secure hardware design against side-channel attacks" by Jungmin Park (PhD thesis, Iowa State University, 2016), which is hereby incorporated by reference in its entirety. The KL-divergence using random patterns is 3.3 and 2.5 for AES-GF and AES-LUT implementation in FPGA-EXP, respectively. This is 30 times and 7 times less compared to SCV-guided patterns HW=32, respectively. KL-divergence can be used to distinguish vulnerable implementations. From this perspective, one can see that the SCV-guided patterns produce much better results as compared to the random patterns.

Figure 12A:
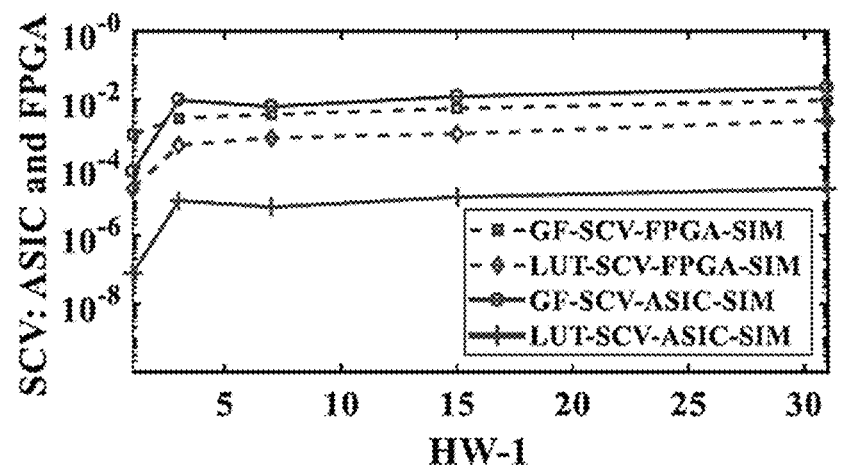

Results: SCV Estimation and Validation. In this section, the SCV metric calculated by SCRIPT is presented. Once the power difference has been calculated for the desired HW, the $P_{noise}$ was measured using the vector-less power estimation technique. The SCV values in ASIC-SIM and FPGA-SIM flows can then be calculated (as shown in FIG. 6). FIG. 12A shows HW-1 vs. SCV values in ASIC-SIM and FPGA-SIM platforms using a base 10 logarithmic scale for the y-axis and a linear scale for the x-axis. According to the SCV metric the AES-GF implementation is more vulnerable to side-channel leakage as compared to the AES-LUT. Also, note that the SCV metric is greater in ASIC-SIM w.r.t. FPGA-SIM. The reason is that $P_{noise}$ in ASIC-SIM is lower as compared to FPGA-SIM (FPGA has higher power consumption).

Next, the SCV metric estimated at pre-silicon was validated by calculating the SNR metric experimentally from FPGA. The SNR metric in FPGA-EXP for different HWs was evaluated using the same measurement technique shown in "A statistics-based fundamental model for side-channel attack analysis" by Y. Fei et al. (*IACR Cryptology ePrint Archive*, 2014:152, 2014) and "Examining smart-card security under the threat of power analysis attacks" by T. S. Messerges et al. (*IEEE transactions on computers*, 51(5): 541-552, 2002), which are hereby incorporated by reference in their entireties. As discussed in the SCV Metric Section above, SCV is conceptually similar to SNR; however, due to the different calculation strategies, these two values are not numerically equal. FIG. 12B shows the scaled values of SCV metric in FPGA-SIM and SNR metric measured in FPGA-EXP. It shows there exists good correlation between these two metrics. The Pearson correlation coefficient for AES-GF is 0.99, whereas for AES-LUT it is 0.94. This validates that the SCV metric can be used to obtain a good estimate of the SNR. The scaling factor was empirically derived to be (0.003)−1. Note that the scaling factor is common for all designs, e.g., the SCV values for both AES-GF and AES-LUT are scaled with the same factor (shown in FIG. 12B). In Appendix B below, this scaling factor is mathematically derived.

Evaluation Time: The SCRIPT framework applied to the gate-level AES designs needed on average 3 minutes for the IFT analysis and less than 1 minute for the SPG. This step is common for both ASIC-SIM and FPGA-SIM flow. The SCV-guided pattern simulation and power estimation on average needed less than 1 minute for ASIC-SIM and 5 minutes for FPGA-SIM (per pattern). Therefore, the overall runtime (on average) for SCV estimation needs 6 minutes for ASIC-SIM and 14 minutes for FPGA-SIM. The evaluation time is much smaller than the previously proposed pre-silicon-based PSCL assessments of "Power estimation for intellectual property-based digital systems at the architectural level" by Y. A. Durrani (*Journal of King Saud University—Computer and Information Sciences*, 26(3): 287-295, 2014) and "Securing encryption algorithms against dpa at the logic level: Next generation smart card technology" by K. Tiri et al. (*International Workshop on Cryptographic Hardware and Embedded Systems*, pages 125-136, Springer, 2003). For example, if it is desired to evaluate SNR metric using 10,000 plaintext inputs in the gate-level simulation, it would take around 31 days to measure it (it takes on average 4.5 minutes to estimate power for each pattern in the simulation using similar workstation). All of the experiments were performed on a 64-bit Linux system running on Intel Core i5 at 1.800 GHz with 8 GB of memory.

Area, Performance vs. Security: The table of FIG. 13 shows the comparison between area, performance and security for AES-GF and AES-LUT designs for both ASIC-SIM and FPGA-SIM flows. Here, G and R represents the number of gates and registers for ASICSIM flow, whereas, L and R represents the number of look-up-tables (LUTs) and registers for FPGA-SIM flow. The security is represented in terms of maximum SCV value. The table of FIG. 13 states that this particular AES-GF implementation utilizes relatively higher area and has lower performance as compared to the AES-LUT implementation. Also, the AES-GF implementation is more vulnerable to power SCA compared to AES-LUT implementation as indicated by the SCV metric.

SCV vs. SNR: SCV utilizes formal verification to generate guided patterns. These patterns only introduce switching in the logic related to the target function while muting the switching of the rest of the design and thereby, derive SCV using as few as two patterns. In contrast, SNR is calculated by performing DPA which needs thousands of plaintexts to make the difference of mean (DOM), i.e., the numerator of the SNR equation measureable. Therefore, evaluating SNR metric at pre-silicon (using 10,000 plaintext) would need 31 days whereas, SCV metric needs 14 minutes to evaluate using same simulation setup.

Success Rate: SCV and SNR. As mentioned in the Derivation of SR from SCV Section, the success rate (SR) based on the maximum likelihood estimation can be estimated using SNR and an algorithmic confusion coefficient. Since the algorithmic confusion coefficient is determined by the target function and the SNR is estimated by the SCV (SCV is related to SNR by a scaling factor), the SCRIPT framework allows the estimation SR w.r.t. the number of plaintexts (or leakage power traces) at pre-silicon design stage. SNRs of 0.016 and 0.0075 were estimated for AES-GF and AES-LUT implementations respectively using SCV and the aforementioned empirically derived scaling factor. By Eq. (9), SR is estimated in FPGA-SIM for AES-GF and AES-LUT and is illustrated in FIG. 12C. In order to validate the accuracy of the estimated SR in FPGA-SIM, CPA attacks are experimentally performed on FPGA-EXP to reveal an 8-bit sub-key. In the experiments, 100 CPA attacks with randomly generated n plaintexts are performed repeatedly in FPGA-EXP and the number of successful attacks are counted in order to measure the SR w.r.t. to n plaintexts in FPGA-EXP. At least 40K and 130K plaintexts are needed to satisfy 100% SR in AES-GF and AES-LUT implementations, respectively in FPGA-EXP. FIG. 12C shows the plots of SR estimated at FPGA-SIM and SR calculated in FPGA-EXP of AES-GF and AES-LUT implementations w.r.t. to the number of plaintexts. The Pearson correlation coefficients between the SR estimated at FPGA-SIM and the SR calculated in FPGA-EXP of AES-GF and AES-LUT are 0.93 and 0.99, respectively. Therefore, this demonstrates that SCRIPT accurately predicts the SR (or equivalently the number of plaintexts needed for a successful SCA) in pre-silicon stage.

While the SCRIPT framework allows for automated PSCL assessment at the pre-silicon stage, there are some limitations in the framework that may be improved. The SCRIPT framework in its current version can only track target registers and identify the registers storing the first round result. However, the IFT technique may be extended to detect nets as well, to increase the granularity of the IFT analysis and identify intermediate target operations, e.g., SBox.

The SCV metric estimated at the pre-silicon stage has high correlation with the SNR metric measured from post-silicon implementation. However, the numerical value of SCV metric is not same as the SNR and needs a scaling factor. In this disclosure, the scaling factor between SCV and SNR metrics is mathematically derived and this scaling factor empirically evaluated. Different crypto benchmarks can be used to analyze and prove that the scaling factor is same for all designs.

The SCRIPT framework may not be used to assess SCA resiliency for certain hardware designs incorporating masking countermeasures. The reason is that masking utilizes randomization to counteract SCAs. The SCRIPT framework may not be compatible with hardware designs which include random number generators. The SCRIPT framework may be modified to be compatible with SCA countermeasures incorporated in hardware crypto modules. While the discussion was focused on the first-order side-channel attacks, the SCRIPT framework may be extended to include the higher-order SCAs as well.

In the present disclosure, the focus was on vulnerability analysis of only crypto modules. However, the SCRIPT framework may be applied to any hardware design to assess its side-channel leakage vulnerability. It has been shown in previous literature that non-crypto hardware design can also leak side-channel information. For example, logic obfuscation keys can be leaked through side-channel. Established strategies for side-channel leakage evaluation cannot be applied to such non-crypto hardware modules. The SCRIPT framework can be a viable solution to identify potential PSCL vulnerabilities in such designs, and the SCRIPT framework may be applied to non-crypto hardware designs.

SCRIPT framework can identify which specific operation and at which clock instance leaks side-channel information. This knowledge can be utilized to apply localized countermeasures. That is, instead of blindly applying a countermeasure to the whole design, a countermeasure for only operations which are responsible for PSCL can be developed. Such localized countermeasure techniques would need lower cost and performance overhead. The SCRIPT framework can be used to develop a countermeasure which only focuses on target functions.

SCRIPT framework can be an important component for developing CAD frameworks which aim at automating the security vulnerability assessment of hardware designs at design stages. This framework would allow the semiconductor industry to systematically identify side-channel vulnerabilities before tape-out in order to include proper countermeasures or refine the design to address them.

Figure 14:
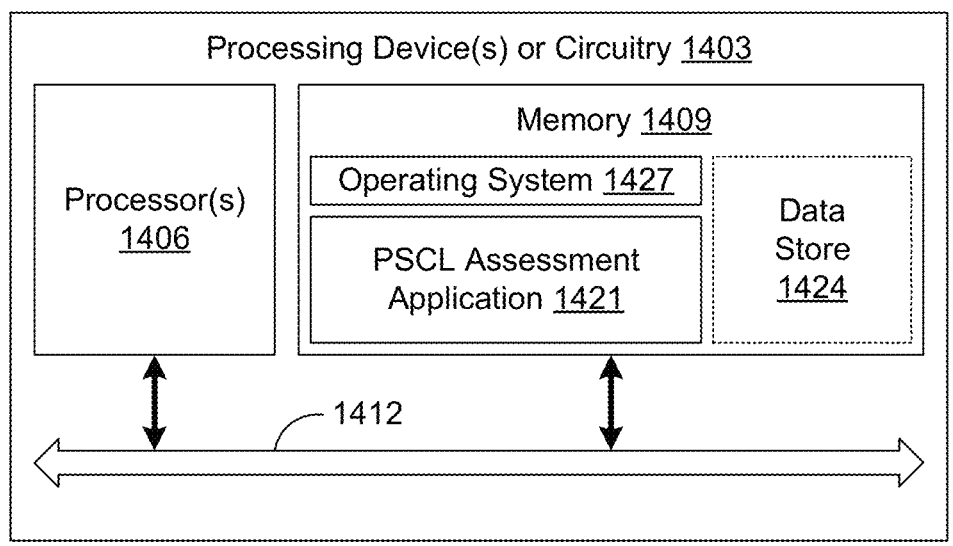
FIG. 14 is a block diagram illustrating an example of a processing device or processing circuitry that can be used for pre-silicon PSCL evaluation, in accordance with various embodiments of the present disclosure.

Referring now to FIG. 14, shown is an example of a processing device or processing circuitry (e.g., a computing system such as a computer, tablet, etc.) that may be utilized for PSCL assessment using the SCRIPT framework, as disclosed herein. The processing device or processing circuitry 1403 can comprise at least one processor circuit, for example, having a processor 1406 and a memory 1409, both of which are coupled to a local interface 1412. The processing device or processing circuitry 1403 may include, for example, one or more display devices and various peripheral devices. The local interface 1412 may comprise, for example, a data bus with an accompanying address/control bus or other bus structure as can be appreciated.

Stored in the memory 1409 can be both data and several components that are executable by the processor 1406. In particular, stored in the memory 1409 and executable by the processor 1406 include a PSCL assessment application 1421, which uses the SCRIPT format, and potentially other applications. Also stored in the memory 1409 may be a data store 1424 and other data. The data stored in the data store 1424, for example, is associated with application-specific integrated circuit (ASIC) and field programmable gate array (FPGA) design that may be evaluated by the PSCL assessment application 1421. For example, the data store may include chip layouts, data sets, databases, and other data or information as can be understood. In addition, an operating system 1427 may be stored in the memory 1409 and executable by the processor 1406. The data store 1424 may be may be located in a single processing device or may be dispersed among many different devices. The components executed on the processing device or processing circuitry 1403 include, for example, the PSCL assessment application 1421 and other systems, applications, services, processes, engines, or functionality not discussed in detail herein. It is understood that there may be other applications that are stored in the memory 1409 and are executable by the processor 1406 as can be appreciated. Where any component discussed herein is implemented in the form of software, any one of a number of programming languages may be employed.

A number of software components can be stored in the memory 1409 and are executable by the processor 1406. In this respect, the term "executable" means a program file that is in a form that can ultimately be run by the processor 1406. Examples of executable programs may be, for example, a compiled program that can be translated into machine instructions in a format that can be loaded into a random access portion of the memory 1409 and run by the processor 1406, source code that may be expressed in proper format such as object code that is capable of being loaded into a random access portion of the memory 1409 and executed by the processor 1406, or source code that may be interpreted by another executable program to generate instructions in a random access portion of the memory 1409 to be executed by the processor 1406, etc. An executable program may be stored in any portion or component of the memory 1409 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 1406 may represent multiple processors 1406 and the memory 1409 may represent multiple memories 1409 that operate in parallel processing circuits, respectively. In such a case, the local interface 1412 may be an appropriate network that facilitates communication between any two of the multiple processors 1406, between any processor 1406 and any of the memories 1409, or between any two of the memories 1409, etc. The local interface 1412 may comprise additional systems designed to coordinate this communication, including, for example, performing load balancing. The processor 1406 may be of electrical or of some other available construction.

Although the PSCL assessment application 1421, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the PSCL assessment application 1421, that comprises software or instructions can be embodied in any non-transitory computer-readable medium for use by or in connection with an instruction execution system such as, for example, a processor 1406 in a computer system or other processing system. In this sense, the logic may comprise, for example, statements including instructions and declarations that can be fetched from the computer-readable medium and executed by the instruction execution system. The flowcharts of FIGS. 2-6 show an example of the architecture, functionality, and operation of possible implementations of a PSCL assessment application 1421. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 2-6. For example, two blocks shown in succession in FIGS. 2-6 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Appendix A—Proof of Theorem 1

In Eq. (9), $$\Delta(k^*, k_i) = \frac{1}{n}\sum_{j=1}^{n}[\ln f_{L|k^*}(l_j) - \ln f_{L|k_i}(l_j)]$$

$$= \frac{1}{2\sigma_N^2 n}\sum_{j=1}^{n}[(l_j - \epsilon h_j^i - \mu_N)^2 - (l_j - \epsilon h_j^* - \mu_N)^2].$$

Let $r_j = l_j - \mu_N - \epsilon h_j^*$. $r_j$ is a Gaussian random variable, i.e., $r_j \sim \mathcal{N}(0, \sigma_N^2)$. Then, $$\Delta(k^*, k_j) = \frac{1}{2\sigma_N^2 n}\sum_{j=1}^{n}[(r_j + \epsilon(h_j^* - h_j^i))^2 - r_j^2]$$

$$= \frac{\epsilon^2}{2n\sigma_n^2}\sum_{j=1}^{n}\left[(h_j^* - h_j^i)^2 + \frac{2}{\epsilon}r_j(h_j^* - h_j^i)\right].$$

Since $E[r_j]=0$, and $r_j$ and $(h_j^* - h_j^i)$ are independent, $E[r_j(h_j^* - h_j^i)]=0$. Thus, $$E[\Delta(k^*, k_j)] = \frac{1}{2n}\left(\frac{\epsilon^2}{\sigma_N^2}\right)nE[(h_j^* - h_j^i)^2] = \frac{1}{2}\left(\frac{\epsilon^2}{\sigma_N^2}\right)E\left[(h_{|k^*} - h_{|k_j})^2\right].$$

The ij-th element of $\Sigma$ in Eq. (11) is $s_{ij} = n \cdot \text{Cov}(\Delta(k^*, k_j), \Delta(k^*, k_j))$.

$$\text{Cov}(\Delta(k^*, k_i), \Delta(k^*, k_j)) = E[\Delta(k^*, k_i)\Delta(k^*, k_j)] - E[\Delta(k^*, k_i)]E[\Delta(k^*, k_j)]$$

$$= \left(\frac{\epsilon^2}{2n\sigma_N^2}\right)^2\sum_{m=1}^{n}\sum_{l=1}^{n}E\left\{\left[(h_l^* - h_l^i)^2 + \frac{2}{\epsilon}(h_l^* - h_l^i)r_l\right]\cdot\left[(h_m^* - h_m^j)^2 + \frac{2}{\epsilon}(h_m^* - h_m^j)r_m\right]\right\} -$$

$$E[\Delta(k^*, k_i)]E[\Delta(k^*, k_j)].$$

Since $E[r_l] = E[r_m] = 0$, and $E[r_l r_m] = 0$ for $l \neq m$, $$\text{Cov}(\Delta(k^*, k_i), \Delta(k^*, k_j)) = \left(\frac{\epsilon^2}{2n\sigma_N^2}\right)^2\sum_{m=1}^{n}\sum_{l=1}^{n}E[(h_l^* - h_l^i)^2(h_m^* - h_m^j)^2] +$$

$$\sum_{l=1}^{n}\left(\frac{2}{\epsilon}\right)^2\sigma_N^2 E[(h_l^* - h_l^i)][(h_l^* - h_l^j)] -$$

$$E[\Delta(k^*, k_i)]E[\Delta(k^*, k_j)]$$

$$= \left(\frac{\epsilon^2}{2n\sigma_N^2}\right)^2\left\{\sum_{m=1}^{n}E[(h_m^* - h_m^i)^2(h_m^* - h_m^j)^2] +\right.$$

$$\sum_{l \neq m}E[(h_l^* - h_l^i)^2]E[(h_m^* - h_m^j)^2] +$$

$$\left.\sum_{l=1}^{n}\left(\frac{2}{\epsilon}\right)^2\sigma_N^2 E[(h_l^* - h_l^i)][(h_l^* - h_l^j)] -\right.$$

$$E[\Delta(k^*, k_i)]E[\Delta(k^*, k_j)]$$

$$= \frac{1}{4n^2}\left(\frac{\epsilon}{\sigma_N}\right)^4\left\{nE\left[(h_{|k^*} - h_{|k_i})^2(h_{|k^*} - h_{|k_j})^2\right] +\right.$$

$$n(n-1)E[(h_{|k^*} - h_{|k_i})^2]E\left[(h_{|k^*} - h_{|k_j})^2\right] +$$

$$\left.n\left(\frac{2\sigma_N}{\epsilon}\right)^2 E\left[(h_{|k^*} - h_{|k_i})(h_{|k^*} - h_{|k_j})\right]\right\} -$$

$$\frac{1}{4}\left(\frac{\epsilon}{\sigma}\right)^4 E[(h_{|k^*} - h_{|k_i})^2]E\left[(h_{|k^*} - h_{|k_j})^2\right]$$

$$= \frac{1}{4n}\left(\frac{\epsilon}{\sigma_N}\right)^4 E\left[(h_{|k^*} - h_{|k_i})^2(h_{|k^*} - h_{|k_j})^2\right] -$$

$$\frac{1}{4n}\left(\frac{\epsilon}{\sigma_N}\right)^4 E[(h_{|k^*} - h_{|k_i})^2]E\left[(h_{|k^*} - h_{|k_j})^2\right] +$$

$$\frac{1}{n}\left(\frac{\epsilon}{\sigma_N}\right)^2 E\left[(h_{|k^*} - h_{|k_i})(h_{|k^*} - h_{|k_j})\right]$$

-continued $$= \frac{1}{n}\left\{\left(\frac{\epsilon}{\sigma_N}\right)^2 E\left[(h_{|k^*} - h_{|k_i})(h_{|k} - h_{|k_j})\right] + \frac{1}{4}\left(\frac{\epsilon^2}{\sigma_N^2}\right)^2 \left[E\left[(h_{|k^*} - h_{|k_i})^2(h_{|k^*} - h_{|k_j})^2\right] - E\left[(h_{|k^*} - h_{|k_i})^2\right] E\left[(h_{|k^*} - h_{|k_j})^2\right]\right]\right\}.$$

Appendix B—Proof of Theorem 2

Let $L^{(1)}$ be the leakage at the pre-silicon stage as follows:

$$L^{(1)} = \{l_j | l_j^{(1)} = \epsilon_1 h_j + N^{(1)}\}.$$

Let $P_{signal}$ in Eq. (4) be the power consumption of the target function with n Hamming distance as follows:

$$P_{signal} = n\epsilon_1^2. \tag{15}$$

Let $P_{noise}$ in Eq. (4) be the power consumption caused by the switching activity of other functions as follows:

$$P_{noise} = E[\{N^{(1)}\}^2] = \text{Var}[N^{(1)}] + \{E[N^{(1)}]\}^2. \tag{16}$$

Since $E[N^{(1)}]$ is equal to $$\frac{w_h}{2}\epsilon_1,$$

where $w_h$ is the bit-width of other functions (i.e., the output transition of other functions is equally distributed), $P_{noise}$ is replaced by follows:

$$P_{noise} = \sigma_{N^{(1)}}^2 + \left(\frac{w_h}{2}\epsilon_1\right)^2 = \sigma_N^2 - \sigma_{N^{(2)}}^2 + \left(\frac{w_h}{2}\epsilon_1\right)^2, \tag{17}$$

where N is the total noise including external (or measurement) noise, $N^{(2)}$ in a measured leakage such that $N = N^{(1)} + N^{(2)}$ (Since $N^{(1)}$ and $N^{(2)}$ are independent, $\sigma_N^2 = \sigma_{N^{(1)}}^2 + \sigma_{N^{(2)}}^2$). By Eqs. (15) and (17), $$SCV_n = \frac{P_{signal}}{P_{noise}} = \frac{n\epsilon_1^2}{\sigma_N^2 - \sigma_{N^{(2)}}^2 + \left(\frac{w_h}{2}\epsilon_1\right)^2}$$

$$= \frac{n\frac{\epsilon_1^2}{\sigma_N^2}}{\left(\frac{w_h^2}{4}\right)\frac{\epsilon_1^2}{\sigma_N^2} + \left(1 - \frac{\sigma_{N^{(2)}}^2}{\sigma_N^2}\right)}$$

$$= \frac{n}{\left(\frac{w_h^2}{4}\right) + \frac{1}{\alpha^2 SNR}\left(1 - \frac{\sigma_{N^{(2)}}^2}{\sigma_N^2}\right)}$$

$$\simeq \frac{n}{\left(1 - \frac{\sigma_{N^{(2)}}^2}{\sigma_N^2}\right)}\alpha^2 SNR$$

where $\alpha^2$ is the scaling factor which is equal to $$\frac{\epsilon_1}{\epsilon}$$

and SNR is $$\frac{\epsilon^2}{\sigma_N^2}.$$

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method for pre-silicon power side-channel leakage (PSCL) assessment, comprising:
    obtaining, by a computing system, an integrated circuit (IC) design;
    identifying, by the computing system, target registers in the IC design;
    generating, by the computing system, input patterns associated with a target function, the input patterns configured to generate a power difference in the target registers when processing the target function;
    determining, by the computing system, a side-channel vulnerability (SCV) metric associated with the power difference produced by the input patterns, wherein the SCV metric is a ratio of a power difference ($P_{signal}$) during target function operation of the IC design and noise power consumption ($P_{noise}$) of the IC design not related to the target function operation, wherein the power difference is a difference in power consumption of the target registers between a first input pattern and a second input pattern that produce different Hamming weights at the target registers;
    identifying, by the computing system, a vulnerability in the IC design associated with the SCV metric; and
    generating, by the computing system, an indication of the vulnerability in the IC design.

2. The method of claim 1, wherein the target registers are identified using an information flow tracking (IFT) engine executed by the computing system, the target registers identified based at least in part upon a gate-level netlist of the IC design.

3. The method of claim 2, wherein the target registers are identified using identified key input ports.

4. The method of claim 2, wherein the IFT engine analyzes propagation of key bits through sequential levels of the IC design to identify propagation paths and a listing of registers where the key bits propagate.

5. The method of claim 4, wherein each register in the listing of registers is evaluated, by the computing system, to identify the target registers based upon a set of predefined properties.

6. The method of claim 5, wherein the set of predefined properties consist of a function of secret information related to the key, a function of controllable inputs to the IC design, a function of a confusion property of the IC design, and a function of a divide-and-conquer property of the IC design.

7. The method of claim 1, wherein the input patterns are SCV-guided patterns generated using SCV-guided pattern generation (SPG) based upon the target registers and target function.

8. The method of claim 7, wherein the SCV-guided patterns are configured to introduce switching in logic of the IC design related to the target function and produce a Hamming weight (HW) at the target registers.

9. The method of claim 1, wherein identification of the vulnerability in the IC design is based upon a success rate (SR) of a side-channel attack on the IC design, where the SR is a likelihood estimation based at least in part upon the SCV.

10. The method of claim 1, further comprising modifying the IC design in response to the identification of the vulnerability.

11. The method of claim 10, further comprising fabricating the modified IC design.

12. The method of claim 1, wherein the IC design is a computer-aided design (CAD) of the IC.

13. The method of claim 1, wherein the IC design comprises a cryptographic circuit.

14. A system for pre-silicon power side-channel leakage (PSCL) assessment, comprising:
  a computing device comprising at least one processor and memory; and
  a PSCL assessment application that, when executed by the at least one processor, causes the computing device to:
    identify target registers in an integrated circuit (IC) design;
    generate input patterns associated with a target function, the input patterns configured to generate a power difference in the target registers when the IC design processes the target function;
    determine a side-channel vulnerability (SCV) metric associated with the power difference produced by the input patterns, wherein the SCV metric is a ratio of a power difference ($P_{signal}$) during target function operation of the IC design and noise power consumption ($P_{noise}$) of the IC design not related to the target function operation, wherein the power difference is a difference in power consumption of the target registers between a first input pattern and a second input pattern that produce different Hamming weights at the target registers; and
    generate an indication of a vulnerability in the IC design associated with the SCV metric.

15. The system of claim 14, wherein the target registers are identified using an information flow tracking (IFT) engine executed by the computing device, the target registers identified based at least in part upon a gate-level netlist of the IC design.

16. The system of claim 14, wherein the input patterns are SCV-guided patterns generated using SCV-guided pattern generation (SPG) based upon the target registers and target function.

17. The system of claim 14, wherein the vulnerability in the IC design is identified based upon a success rate (SR) of a side-channel attack on the IC design, where the SR is a likelihood estimation based at least in part upon the SCV.

* * * * *